US010650466B1

(12) United States Patent
Hayward et al.

(10) Patent No.: US 10,650,466 B1
(45) Date of Patent: May 12, 2020

(54) SYSTEMS AND METHODS FOR GRID-BASED INSURANCE RATING

(71) Applicant: STATE FARM MUTUAL AUTOMOBILE INSURANCE COMPANY, Bloomington, IL (US)

(72) Inventors: Gregory Hayward, Bloomington, IL (US); Scott T. Christensen, Salem, OR (US); Bryan Scott Wade, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 16/277,376

(22) Filed: Feb. 15, 2019

Related U.S. Application Data

(63) Continuation of application No. 13/913,165, filed on Jun. 7, 2013, now Pat. No. 10,262,373.

(51) Int. Cl.
*G06Q 40/08* (2012.01)
(52) U.S. Cl.
CPC .................... *G06Q 40/08* (2013.01)
(58) Field of Classification Search
CPC ....................................................... G06Q 40/08
USPC ............................................................. 705/4
See application file for complete search history.

(56) References Cited

U.S. PATENT DOCUMENTS

| | | | |
|---|---|---|---|
| 5,796,634 A | 8/1998 | Craport et al. | |
| 5,848,373 A | 12/1998 | DeLorme et al. | |
| 5,897,619 A | 4/1999 | Hargrove, Jr. et al. | |
| 6,186,793 B1 | 2/2001 | Brubaker | |
| RE40,466 E | 8/2008 | Wallner | |
| 7,441,197 B2 | 10/2008 | Tschiegg et al. | |
| 7,596,542 B1 | 9/2009 | Woll | |
| 7,769,608 B1 | 8/2010 | Woll et al. | |
| RE41,983 E | 12/2010 | Wallner | |
| 7,966,301 B2 | 6/2011 | Toyama et al. | |
| 8,321,472 B1 | 11/2012 | Wolf | |
| 8,364,515 B1 | 1/2013 | Procopiuc | |
| 8,504,393 B2 | 8/2013 | Stewart et al. | |
| 2004/0225665 A1 | 11/2004 | Toyama et al. | |
| 2006/0100912 A1 | 5/2006 | Kumar et al. | |
| 2006/0271531 A1 | 11/2006 | O'Clair et al. | |
| 2007/0294030 A1* | 12/2007 | Jones | G01C 21/26 701/519 |

(Continued)

OTHER PUBLICATIONS

Booth, P. et al., "Modern Actuarial Theory and Practice", Chapman & Hall/CRC, pp. 340-351, 1999.

(Continued)

*Primary Examiner* — Robert R Niquette
*Assistant Examiner* — Liz P Nguyen
(74) *Attorney, Agent, or Firm* — Marshall, Gerstein & Borun LLP

(57) ABSTRACT

A system and method for underwriting and rating insurance products using a programmed computer system to receive usage information of a vehicle within a geographic area or location, determine a target grid cell or a sequence of target grid cells bounded by latitude and longitude lines that encompass at least a portion of the geographic area where the vehicle was used, attain a set of data associated with the target grid cell(s), and calculate a location rating factor based on the usage information, target cell(s), and the set of data.

20 Claims, 20 Drawing Sheets

(56) References Cited

U.S. PATENT DOCUMENTS

| | | |
|---|---|---|
| 2009/0132163 A1 | 5/2009 | Ashley, Jr. et al. |
| 2009/0216918 A1 | 8/2009 | Cardullo |
| 2009/0298511 A1 | 12/2009 | Paulson |
| 2009/0303036 A1 | 12/2009 | Sahuguet |
| 2010/0026683 A1 | 2/2010 | Araki et al. |
| 2010/0030586 A1 | 2/2010 | Taylor et al. |
| 2011/0161116 A1 | 6/2011 | Peak et al. |
| 2011/0317154 A1 | 12/2011 | Tan et al. |
| 2012/0066005 A1* | 3/2012 | Stewart .............. G06Q 30/0282 705/4 |
| 2013/0151293 A1 | 6/2013 | Karner et al. |

OTHER PUBLICATIONS

Brubaker, Randall E., "Geographic Rating of Individual Risk Transfer Costs Without Territorial Boundaries," *Casualty Actuarial Society Forum Casualty Actuarial Society*, 97-128 (1996).

Herzog, T., "Credibility: The Bayesian Model Versus Bühlmann's Model," Transactions of Society of Actuaries, 41:43-88 (1989).

"Pasture, Rangeland, Forage Rainfall Index Plan of Insurance," *USDA Risk Management Agency* (2006). Retrieved from the Internet on Sep. 17, 2013: <http://www.rma.usda.gov/policies/pasturerangeforage/PRF-RI-Condensed.pdf>.

State Farm Mutual Automobile Insurance Company Vermont Auto Insurance Program—Filing Memorandum, 7 pages, Dec. 7, 2009.

Venter, Gary C., "Classical Partial Credibility with Application to Trend," *Proceedings of the Casualty Actuarial Society*, 27-57 (1986).

Prosecution history of U.S. Appl. No. 13/226,785 (now U.S. Pat. No. 8,504,393), entitled "Systems and Methods for Grid-Based Insurance Rating," filed Sep. 7, 2011.

* cited by examiner

| GRID Ring * | Distance Weight |
|---|---|
| 0 | 1.000 |
| 1 | 1.000 |
| 2 | 1.000 |
| 3 | 1.000 |
| 4 | 0.800 |
| 5 | 0.650 |
| 6 | 0.550 |
| 7 | 0.450 |
| 8 | 0.350 |
| 9 | 0.300 |
| 10 | 0.250 |
| 11 | 0.200 |
| 12 | 0.170 |
| 13 | 0.140 |
| 14 | 0.110 |
| 15 | 0.090 |

\* GRID rings are a collection of GRID cells with similar distance from a target GRID cell. Larger ring assignments represent further distances from the target GRID cell.

Figure 9A

| | | GRID Cell Experience Area | Statewide | Description |
|---|---|---|---|---|
| | Premium Data | | | |
| (1) | Current Level Premium | 260,856.25 | 100,000,000.00 | Historical Premium Adjusted to Current Rate Level |
| (2) | Exposure | 5,205.00 | 2,000,000.00 | |
| (3) | Current Level Premium/Exposure | 50.12 | 50.00 | (1) / (2) |
| (4) | Relative to Statewide | 1.00 | | (3) / SW(3) |
| | Loss Data | | | |
| (5) | Non-catastrophe Loss & ALAE | 1,120,750.00 | 300,000,000.00 | |
| (6) | Exposure | 18,143.75 | 5,000,000.00 | |
| (7) | Non-catastrophe Loss & ALAE/Exposure | 61.77 | 60.00 | (5) / (6) |
| (8) | Catastrophe Provision | 0.200 | 0.200 | GRID Cell Catastrophe Provision |
| (9) | Expected Catastrophe Loss & ALAE/Exposure | 12.35 | 12.00 | (7) * (8) |
| (10) | Total Loss & ALAE/Exposure | 74.12 | 72.00 | (7) + (9) |
| (11) | Relative to Statewide | 1.029 | 1.000 | (10) / SW(10) |
| (12) | Expense Flattening Provision | 0.100 | 0.100 | |
| (13) | Expense Flattened Factor | 1.026 | 1.000 | (11) * [1 - (12)] + (12) |
| | Indicated Factor | GRID Cell Experience Area | Statewide | |
| (14) | Present Factor | 1.500 | 1.000 | |
| (15) | Indicated Change | 2.4% | 0.0% | |
| (16) | Initial Indicated Factor | 1.536 | 1.000 | (14) * [1 + (15)] |
| (17) | Credibility Standard | 1,600 | | Based on 90% CI and 15% Error |
| (18) | Non-catastrophe Claims | 996 | | |
| (19) | Credibility | 0.789 | | Minimum{[(18) / (17)] ^ [0.5] , 1.000} |
| (20) | Credibility Complement | 1.500 | | |
| (21) | Credibility Weighted Indicated Factor | 1.528 | 0.980 | (16) * (19) + (20) * [1 - (19)]; SW(21) = weighted average (21) over all GRID cells |
| (22) | Balanced Indicated Factor | 1.559 | 1.000 | (21) / SW(21) |
| (23) | Balanced Indicated Change | 3.9% | 0.0% | (22) / (14) - 1 |

Figure 9B

| | (1) | (2) | (3) | (4) |
|---|---|---|---|---|
| Ring Assignment | Distance Weight | Non-Catastrophe Claims | Non-Catastrophe Claims Used | Distance Weighted Non-Catastrophe Claims Used |
| 0 | 1.0000 | 0 | 0 | 0 |
| 1 | 1.0000 | 75 | 75 | 75 |
| 2 | 1.0000 | 100 | 100 | 100 |
| 3 | 1.0000 | 200 | 200 | 200 |
| 4 | 0.8000 | 150 | 150 | 120 |
| 5 | 0.6500 | 800 | 771 | 501 |
| Total | | 1325 | 1,296 | 996 |

| | (5) | (6) | (7) | (8) |
|---|---|---|---|---|
| Ring Assignment | Current Level Premium | Premium Experience Period Exposure | Non-Catastrophe Loss & ALAE | Loss & ALAE Experience Period Exposure |
| 0 | 0.00 | 0.00 | 0.00 | 0.00 |
| 1 | 15,000.00 | 400.00 | 75,000.00 | 1,000.00 |
| 2 | 10,000.00 | 200.00 | 100,000.00 | 750.00 |
| 3 | 40,000.00 | 900.00 | 250,000.00 | 3,000.00 |
| 4 | 100,000.00 | 1,500.00 | 400,000.00 | 5,000.00 |
| 5 | 185,000.00 | 4,000.00 | 600,000.00 | 15,000.00 |
| Total | 350,000.00 | 7,000.00 | 1,425,000.00 | 24,750.00 |

| | (9) | (10) | (11) | (12) |
|---|---|---|---|---|
| | Adjusted Data | | | |
| Ring Assignment | Current Level Premium | Premium Experience Period Exposure | Non-Catastrophe Loss & ALAE | Loss & ALAE Experience Period Exposure |
| 0 | 0.00 | 0.00 | 0.00 | 0.00 |
| 1 | 15,000.00 | 400.00 | 75,000.00 | 1,000.00 |
| 2 | 10,000.00 | 200.00 | 100,000.00 | 750.00 |
| 3 | 40,000.00 | 900.00 | 250,000.00 | 3,000.00 |
| 4 | 80,000.00 | 1,200.00 | 320,000.00 | 4,000.00 |
| 5 | 115,856.25 | 2,505.00 | 375,750.00 | 9,393.75 |
| Total | 260,856.25 | 5,205.00 | 1,120,750.00 | 18,143.75 |

(3) Actual claims in the outer most ring are limited such that the total claims used does not exceed the number of claims at the selected maximum credibility.
(9) (5) * (4) / (2)
(10) (6) * (4) / (2)
(11) (7) * (4) / (2)
(12) (8) * (4) / (2)

Figure 9C

| GRID Cell | Distance from Target GRID Cell (miles) | GRID Ring | Current Level Premium | Premium Experience Period Exposure | Non-catastrophe claims | Non-catastrophe Loss & ALAE | Loss & ALAE Experience Period Exposure |
|---|---|---|---|---|---|---|---|
| 0369010450 | 0.000 | 0 | 0.00 | 0.00 | 0.00 | 0.00 | 0.00 |
| 0369010449 | 0.553 | 1 | 750.00 | 20.00 | 1.00 | 3,750.00 | 50.00 |
| 0369010451 | 0.553 | 1 | 562.50 | 15.00 | 0.00 | 2,625.00 | 35.00 |
| 0369110450 | 0.691 | 1 | 150.00 | 4.00 | 4.00 | 1,125.00 | 15.00 |
| 0368910450 | 0.691 | 1 | 187.50 | 5.00 | 3.00 | 1,125.00 | 15.00 |
| 0369110449 | 0.885 | 1 | 75.00 | 2.00 | 0.00 | 375.00 | 5.00 |
| 0369110451 | 0.885 | 1 | 450.00 | 12.00 | 4.00 | 2,250.00 | 30.00 |
| 0368910449 | 0.885 | 1 | 37.50 | 1.00 | 0.00 | 375.00 | 5.00 |
| 0368910451 | 0.885 | 1 | 75.00 | 2.00 | 2.00 | 375.00 | 5.00 |
| 0369010448 | 1.105 | 1 | 562.50 | 15.00 | 3.00 | 2,625.00 | 35.00 |
| 0369010452 | 1.105 | 1 | 375.00 | 10.00 | 1.00 | 1,875.00 | 25.00 |
| 0369110448 | 1.303 | 1 | 712.50 | 19.00 | 5.00 | 3,375.00 | 45.00 |
| 0369110452 | 1.303 | 1 | 562.50 | 15.00 | 2.00 | 3,000.00 | 40.00 |
| 0368910448 | 1.304 | 1 | 487.50 | 13.00 | 3.00 | 2,250.00 | 30.00 |
| 0368910452 | 1.304 | 1 | 750.00 | 20.00 | 2.00 | 3,750.00 | 50.00 |
| 0369210450 | 1.382 | 1 | 750.00 | 20.00 | 0.00 | 3,750.00 | 50.00 |
| 0368810450 | 1.382 | 1 | 375.00 | 10.00 | 2.00 | 1,875.00 | 25.00 |
| 0369210449 | 1.488 | 1 | 375.00 | 10.00 | 0.00 | 1,875.00 | 25.00 |
| 0369210451 | 1.488 | 1 | 750.00 | 20.00 | 1.00 | 3,750.00 | 50.00 |
| 0368810449 | 1.488 | 1 | 562.50 | 15.00 | 2.00 | 2,625.00 | 35.00 |
| 0368810451 | 1.488 | 1 | 1,125.00 | 30.00 | 10.00 | 5,625.00 | 75.00 |
| 0369010447 | 1.658 | 1 | 187.50 | 5.00 | 0.00 | 1,125.00 | 15.00 |
| 0369010453 | 1.658 | 1 | 937.50 | 25.00 | 1.00 | 4,500.00 | 60.00 |
| 0369210448 | 1.769 | 1 | 262.50 | 7.00 | 4.00 | 1,500.00 | 20.00 |
| 0369210452 | 1.769 | 1 | 562.50 | 15.00 | 0.00 | 2,625.00 | 35.00 |
| 0368810448 | 1.770 | 1 | 487.50 | 13.00 | 9.00 | 2,250.00 | 30.00 |
| 0368810452 | 1.770 | 1 | 150.00 | 4.00 | 3.00 | 750.00 | 10.00 |
| 0369110447 | 1.796 | 1 | 300.00 | 8.00 | 0.00 | 1,500.00 | 20.00 |
| 0369110453 | 1.796 | 1 | 1,125.00 | 30.00 | 7.00 | 5,625.00 | 75.00 |
| 0368910447 | 1.796 | 1 | 375.00 | 10.00 | 0.00 | 1,875.00 | 25.00 |
| 0368910453 | 1.796 | 1 | 937.50 | 25.00 | 6.00 | 4,875.00 | 65.00 |
| ... | ... | ... | ... | ... | ... | ... | ... |
| Total | | | 350,000.00 | 7,000.00 | 1,325.00 | 1,425,000.00 | 24,750.00 |

Figure 9D

Method 1: Basic Approximation

$D = (X^2 + Y^2)^{0.5}$ $X = (LAT2 - LAT1)$
$Y = (LON2 - LON1)$

Method 2: Basic Approximation with Constant Adjustments for Miles per Degree Latitude and Longitude

$D = (X^2 + Y^2)^{0.5}$ $X = 69.1 * (LAT2 - LAT1)$
$Y = 53.0 * (LON2 - LON1)$ 69.1 - approximate miles per degree latitude = 24,901.92 miles
(earth circumference at equator) / 360 degrees
53.0 = approximate miles per degree longtitude
(at 40 degrees latitude)

Method 3: Basic Approximation with Constant Adjustment for Miles per Degree Latitude and Varying Adjustment for Miles per Degree Longitude

$D = (X^2 + Y^2)^{0.5}$ $X = 69.1 * (LAT2 - LAT1)$
$Y = 69.1 * COS(LAT1 * \pi / 180) * (LON2 - LON1)$ 69.1 = approximate miles per degree latitude = 24,901.92 miles (earth circumference at equator) / 360 degrees
$69.1 * COS(LAT1 * \pi / 180)$ = approximate miles per degree longitude adjusted for latitude

Method 4: Great Circle Distance Formula

$D = 69.1 * (180 / \pi) * ARCCOS[SIN(LAT1 * \pi / 180)SIN(LAT2 * \pi / 180) + COS(LAT1 * \pi / 180)COS(LAT2 * \pi / 180)COS(LON2 * \pi / 180 - LON1 * \pi / 180)]$

Figure 9E

Variation in Calculated Distance by Method to Calculate Distance between Two Latitude/Longitude Coordinates

| Location | Latitude 1 | Longitude 1 | Distance Method | Distance (in miles) between Latitude/Longitude 1 and Latitude/Longitude 2* | | | Ring Assignment based on Distance between Latitude/Longitude 1 and Latitude/Longitude 2* | | |
|---|---|---|---|---|---|---|---|---|---|
| | | | | 0.01 | 0.20 | 0.34 | 0.01 | 0.20 | 0.34 |
| Anchorage, AK | 61.21 | -149.85 | 1 | 0.88 | 17.58 | 29.88 | 1 | 9 | 15 |
| | | | 2 | 0.87 | 17.42 | 29.61 | 1 | 9 | 15 |
| | | | 3 | 0.77 | 15.34 | 26.08 | 1 | 8 | 14 |
| | | | 4 | 0.77 | 15.33 | 26.05 | 1 | 8 | 14 |
| Wahalla, ND | 48.92 | -97.92 | 1 | 0.88 | 17.58 | 29.88 | 1 | 9 | 15 |
| | | | 2 | 0.87 | 17.42 | 29.61 | 1 | 9 | 15 |
| | | | 3 | 0.83 | 16.54 | 28.11 | 1 | 9 | 15 |
| | | | 4 | 0.83 | 16.53 | 28.08 | 1 | 9 | 15 |
| Des Moines, IA | 41.6 | -93.61 | 1 | 0.88 | 17.58 | 29.88 | 1 | 9 | 15 |
| | | | 2 | 0.87 | 17.42 | 29.61 | 1 | 9 | 15 |
| | | | 3 | 0.86 | 17.26 | 29.34 | 1 | 9 | 15 |
| | | | 4 | 0.86 | 17.25 | 29.31 | 1 | 9 | 15 |
| Bloomington, IL | 40.46 | -88.99 | 1 | 0.88 | 17.58 | 29.88 | 1 | 9 | 15 |
| | | | 2 | 0.87 | 17.42 | 29.61 | 1 | 9 | 15 |
| | | | 3 | 0.87 | 17.37 | 29.52 | 1 | 9 | 15 |
| | | | 4 | 0.87 | 17.36 | 29.49 | 1 | 9 | 15 |
| Tulsa, OK | 36.13 | -95.99 | 1 | 0.88 | 17.58 | 29.88 | 1 | 9 | 15 |
| | | | 2 | 0.87 | 17.42 | 29.61 | 1 | 9 | 15 |
| | | | 3 | 0.89 | 17.76 | 30.20 | 1 | 9 | -- |
| | | | 4 | 0.89 | 17.76 | 30.17 | 1 | 9 | -- |
| Atlanta, GA | 33.8 | -84.42 | 1 | 0.88 | 17.58 | 29.88 | 1 | 9 | 15 |
| | | | 2 | 0.87 | 17.42 | 29.61 | 1 | 9 | 15 |
| | | | 3 | 0.90 | 17.97 | 30.55 | 1 | 9 | -- |
| | | | 4 | 0.90 | 17.96 | 30.52 | 1 | 9 | -- |
| Brownsville, TX | 25.96 | -97.49 | 1 | 0.88 | 17.58 | 29.88 | 1 | 9 | 15 |
| | | | 2 | 0.87 | 17.42 | 29.61 | 1 | 9 | 15 |
| | | | 3 | 0.93 | 18.58 | 31.59 | 1 | 10 | -- |
| | | | 4 | 0.93 | 18.58 | 31.57 | 1 | 10 | -- |
| Honolulu, HI | 21.31 | -157.82 | 1 | 0.88 | 17.58 | 29.88 | 1 | 9 | 15 |
| | | | 2 | 0.87 | 17.42 | 29.61 | 1 | 9 | 15 |
| | | | 3 | 0.94 | 18.89 | 32.11 | 1 | 10 | -- |
| | | | 4 | 0.94 | 18.88 | 32.09 | 1 | 10 | -- |

* Latitude 2 and Longitude 2 are derived by adding the decimal amounts above to Latitude 1 and Longitude 1.

Figure 9F

SYSTEMS AND METHODS FOR GRID-BASED INSURANCE RATING

CROSS-REFERENCE TO RELATED APPLICATIONS

This application is a continuation of U.S. patent application Ser. No. 13/913,165, filed on Jun. 7, 2013, the entire disclosure of which is hereby expressly incorporated herein by reference.

TECHNICAL FIELD

The present disclosure relates generally to systems and methods for underwriting an insurance policy for a vehicle. These systems and methods may utilise computer, hardware, software, and data stores to gather and process data to determine rating factors for grid locations associated with a geographic area where the vehicle is used.

BACKGROUND

Insurance underwriting is the process of assessing the value of a given risk, and in turn pricing a policy to protect against that risk. Fundamentally, insurance premiums are designed to reflect the amount of a payout should a covered event occur in view of the likelihood of the occurrence of that event. The process of determining the cost of an insurance policy is called rating. The rating process may include a number of variables, including experience data for a specific insured, experience data for a class of insured entities, capital investment predictions, profit margin targets, and a wide variety of other data useful for predicting the occurrence of certain real-world events as well as the amount of damage likely to result from such events.

Further, "experience rating" involves analyzing past claims experience to determine a prospective premium amount and/or a retrospective premium adjustment. See, e.g., P. Booth, "Modern Actuarial Theory and Practice," 340-51 (Chapman & Hall/CRC 1999). For example, a business may operate a large fleet of vehicles. And, that business may seek to insure the vehicles to cover property damage and to cover possible personal injury claims if a fleet vehicle were to be in an accident with another vehicle. If the fleet is large enough or the business has been operating the fleet long enough, there may be enough historical data to reliably and accurately estimate the expected claims for the next year. That estimate (possibly combined with an allocation of expenses or assessment of an administrative fee) would represent the insurance premium in an ideal scenario. At the end of the annual policy term, a surcharge or refund may also be appropriate if the actual claims for the term were higher or lower than the estimated claims amount.

A typical family seeking automobile insurance cannot, however, produce anywhere near the amount of data needed to make a reliable and accurate estimate of anticipated claims for their vehicle or vehicles. Thus, insurance companies must rate personal policies in a risk pool of comparable policies to produce enough data to make such an estimate. One mechanism for doing this is to assess what data is available for the family (e.g., demographic information, types of vehicles, and what limited claim information is available) and use that data to assign an appropriate pool to the family.

The myriad types of data available to an insurer for performing the rating process are often associated with geographic locations or regions. However, this association is not consistent or uniform. Some property crime data is associated with a "block" of addresses on a city street, e.g., 300-400 block of Main Street. Flood zone data and land elevation data may be stored as complex topographic maps. Loss experience data may be associated with a coordinate pair representing the longitude and latitude of the location of the loss event.

At present, insurance rating requires a complex search process to compile relevant data for input into a rating function. For example, a policy to be rated may be associated with a specific location, e.g., a street address of a home or office or the location where a vehicle will be parked at night. To rate a policy for that location, some subset of the relevant data must be gathered and provided to a rating algorithm. The gathering process is often computationally difficult in view of the inconsistent and non-uniform associations of data to geography discussed above. In some instances, data is processed and aggregated by county, city, and/or postal ZIP code. This aggregation is made difficult by the nearly arbitrary boundaries defined by county lines, city limits, and ZIP codes. Further, county, city, and postal ZIP code boundaries may change over time. In other instances, data is processed by aggregated sales territory.

Rates appropriated to each area are generally determined based on the associated historical claims experience. While existing methods of territorial rating have served insurance providers well, these approaches can be problematic for several reasons: (1) geographic boundaries can change, as discussed above; (2) geographic areas may be larger than desired; (3) populations may not be equally distributed within these geographic areas; (4) historical claim experience within these geographic areas may be limited; and (5) where a vehicle is garaged does not accurately measure geographic risk of where the vehicle is used.

SUMMARY

In accordance with the teachings of the present disclosure, disadvantages, and problems associated with existing insurance rating systems have been reduced.

According to one aspect of the invention, there is provided a method for rating insurance products using a programmed computer system. The method comprises receiving usage information of the vehicle within the geographic area, determining each of a plurality of coordinate grid cells or blocks, e.g., target grid cells or target cells, that encompasses at least a portion of the geographic area where the vehicle was used, querying a database to attain a set of data associated with each of the determined plurality of grid cells that encompasses at least a portion of the geographic area where the vehicle was used, receiving the queried set of data associated with each of the plurality of grid cells that encompasses at least a portion of the geographic area where the vehicle was used, calculating a location rating factor based on the usage information and the received set of data associated with each of the plurality of grid cells that encompasses at least a portion of the geographic area where the vehicle was used, and communicating the calculated the location rating factor to a user.

According to another aspect of the invention, there is provided a method for rating insurance products using a programmed computer system. The method comprises storing data associated with a plurality of grid cells or blocks corresponding to a geographic area, receiving a query for a vehicle insurance rate for the vehicle, and receiving usage information of the vehicle within the geographic area, wherein the usage information including a route travelled by the vehicle. The method further includes determining a sequence of grid cells, e.g., target grid cells or target cells, that encompasses the one or more routes travelled by the vehicle, querying a database to attain a set of data associated with each of the grid cells within the sequence of grid cells that encompasses the route(s) travelled by the vehicle, receiving the queried set of data associated with each of the plurality of grid cells within the sequence of grid cells that encompasses the route(s) travelled by the vehicle, calculating a location rating factor based on the usage information and the received set of data associated with each of the grid cells within the sequence of grid cells that encompasses the route(s) travelled by the vehicle, and communicating the calculated location rating factor to a user.

According to a further aspect of the invention, there is provided a computer system for underwriting and rating insurance products. The computer system comprises a processor communicatively coupled to a user interface, a coordinate grid system associated with a geographic area, wherein the coordinate grid system includes a plurality of grid cells or blocks and each grid cell comprising a four-sided area defined by latitude and longitude values. The computer system further includes a database communicatively coupled to the processor, wherein the database stores data associated with the plurality of grid cells, and a position monitoring device communicatively coupled to the processor for monitoring usage of a vehicle. The computer system further includes a non-transitory, tangible computer readable memory communicatively coupled to the processor; and a set of computer readable instructions stored in the non-transitory computer readable memory, which when executed by the processor, are configured to: receive a query for a vehicle insurance rate for the vehicle, receive usage information of the vehicle from the position monitoring device; determine each of the plurality of grid cells, e.g., target grid cells or target cell, that encompasses at least a portion of a geographic location where the vehicle was used, query the database to attain a set of data associated with each of the determined grid cells that encompasses at least a portion of the geographic area where the vehicle was used, receive the queried set of data associated with each of the plurality of grid cells that encompasses at least a portion of the geographic area where the vehicle was used, calculate a location rating factor based on the usage information and the received set of data associated with each of the plurality of grid cells that encompasses at least a portion of the geographic area where the vehicle was used, and communicate the calculated location rating factor to a user.

In further accordance with any one or more of the foregoing exemplary aspects or embodiments, a system, method, and/or computer-readable medium may further include any one or more of the following preferred forms.

In one preferred form, the method includes monitoring, via a position monitoring device, usage of the vehicle within the geographic area.

In another preferred form, the usage information of the vehicle includes one or more of the following: location, miles driven, moving time, non-moving time, total time within one of the plurality of grid cells, time when vehicle ignition is on, time when vehicle ignition is off, and vehicle velocity.

In another preferred form, the set of data includes one or more of the following: census data, crime data, weather data, historical data, and other data, such as quantity of vehicle insurance claims, severity of vehicle insurance claims, frequency of vehicle insurance claims, police reports, driving statistics, road statistics, time, date, and population density.

In another preferred form, the location of the vehicle includes a coordinate pair comprising a longitude value and a latitude value.

In another preferred form, each of the grid cells of the plurality of grid cells includes a four-sided area defined by latitude and longitude values of a coordinate grid system defining a geographic size of that particular coordinated grid cell.

In another preferred form, the method includes adjusting the geographic size of one or more coordinate grid cells by truncating the number of digits in the latitude and longitude values that define that grid cells.

In another preferred form, the method includes automatically comparing the usage information of the vehicle to usage criteria of a vehicle insurance policy; automatically detecting a discrepancy between the usage information of the vehicle and the usage criteria of the vehicle insurance policy; and automatically notifying a user, for example, an insurance agent or an owner of the vehicle, of the detected discrepancy between the usage information of the vehicle and the usage criteria of the vehicle insurance policy.

In another preferred form, the method includes querying, via the processor, a database to attain a supplemental set of data associated with grid cells adjacent to the sequence of target grid cells that encompasses the one or more routes travelled by the vehicle (for example, a border of grid cells along the sides of the sequence of target grid cells). The method further includes receiving, at the processor, the queried supplemental set of data associated with grid cells adjacent to the sequence of grid cells that encompasses the route(s) travelled by the vehicle, and calculating, via the processor, a location rating factor based on the usage information, the received set of data associated with each of the grid cells within the sequence of grid cells that encompasses the route(s) travelled by the vehicle, and the received set of supplemental data associated with grid cells adjacent to the sequence of grid cells that encompasses the route(s) travelled by the vehicle.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 9A provides representative GRID distance weighting values, for an automobile example.

FIG. 9B provides an overview of the methodology for an automobile example.

FIG. 9C provides the GRID ring level data for an automobile example.

FIG. 9D provides the GRID cell level data for an automobile example.

FIG. 9E provides methodologies for calculating distance between two latitude and longitude coordinate pairs in an automobile example.

FIG. 9F provides the results of the distance calculations for an automobile example.

DETAILED DESCRIPTION

Figure 1:
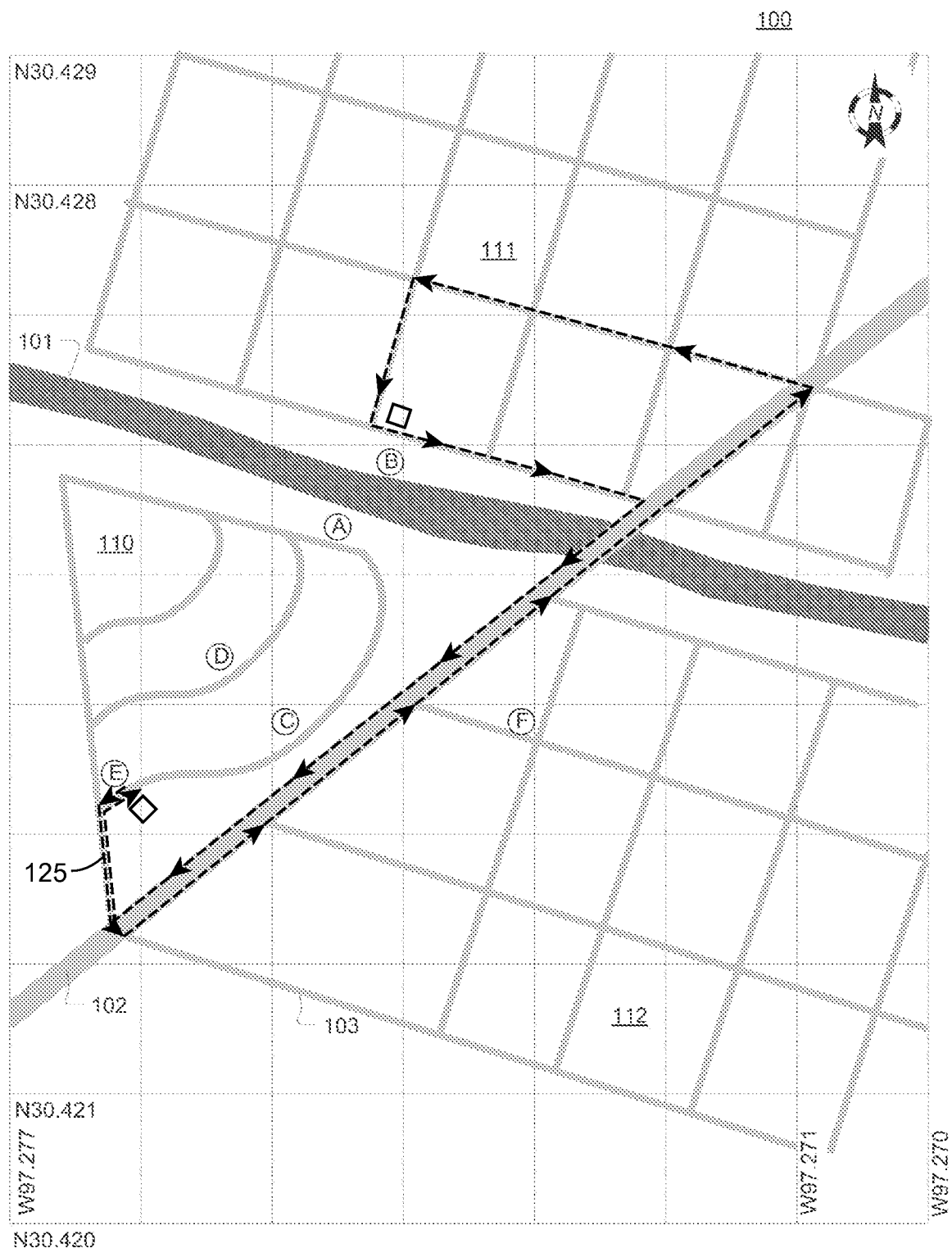
FIG. 1 illustrates a stylized town map overlaid with a coordinate grid, according to certain embodiments of the present disclosure.

Preferred embodiments and their advantages over the prior art are best understood by reference to FIGS. 1-10 below. However, the present disclosure may be more easily understood in the context of a high level description of certain embodiments.

As discussed in the BACKGROUND, insurance risks are often rated based on data relevant to one or more particular geographic locations. For example, a vehicle insurance policy may represent a risk that varies relative to the location where a vehicle is parked or driven. If the vehicle is driven or parked on the street in an urban neighborhood, the risk of damage may be significantly higher than if the vehicle is driven in a rural area or parked in a secure garage. For the purposes of this disclosure, the term target location or target cell will be used to reference a specific geographic location relevant to rating of a specific covered risk. In some circumstances, there may be multiple relevant geographic locations (e.g., a garage location and a work location for a vehicle, or a sequence of locations such as one or more routes travelled by a vehicle), and each location may be treated independently, collectively, and/or in some combination thereof.

One aspect of the invention is to utilize territories defined by latitude and longitude coordinates. This technique allows insurance providers to more finely segment policy pricing based on geographic characteristics and provides more pricing points than current structures. For purposes of this application, the system is called Geographic Rating Identification (GRID) Based Rating and utilizes latitude and longitude coordinates to determine a location rating factor (LRF) that may apply to a policy. An LRF represents geographic risk of the insurance policy. The GRIDs may be set up so that the individual target cells are not equal in size according to area. Rather, the latitudinal and longitudinal coordinates may be truncated at varying precisions to provide individual target cells of different sizes according to area. For example, in urban, populated areas, the GRID may be smaller, while in rural, less populated areas the GRID may be much larger. Once the GRIDs are established, then individual policies may be quickly assigned to GRIDs by looking up the latitudinal and longitudinal coordinates of the associated usage information of a vehicle. Truncation of the latitudinal and longitudinal coordinates may provide for much quicker lookup functionality.

Latitude and longitude coordinates for particular geographic locations may be obtained via a geocoding process or service, wherein the latitude and longitude coordinates are provided with a precision to the sixth decimal place for both values along with codes indicating the quality of the result. Results at that level of precision identify a geographic point at the sub-inch level.

Latitude and longitude coordinates may be used to define a coordinate system using four defined corners and developing a database table and lookup methodology, wherein each GRID cell area is of similar geographic size. The complexity of the queries required to retrieve results from the developed tables makes this solution less preferred.

Alternatively, a database function may be used to group geographically like risks. Typically, these areas are not equal in geographic size. The grouping may use a single database function to provide significantly faster results. This method also could be easily integrated with existing database systems used for the rating process and can more easily connect the pieces to form a countrywide map.

According to a further alternative, latitude and longitude coordinates are used to define GRID cells of different sizes. Because the latitude and longitude coordinates provide precision to the sixth decimal place, larger GRID cells may be defined by truncating the latitude and longitude coordinates to fewer decimal places. Thus a single database may accommodate variable GRID cell sizes wherein larger GRID cells are defined by latitude and longitude coordinates that have fewer decimal places and smaller GRID cells are defined by latitude and longitude coordinates that have more decimal places.

Some benefits of GRID Based Rating include: (1) latitude and longitude coordinates are fixed and do not change over time (unlike ZIP codes or other geographic boundaries); (2) rates are based on loss experience in the target GRID cell and nearby GRID cells, as opposed to large areas covering multiple ZIP codes or counties with portions remote from the location of interest; (3) improved matching of price to risk over current territorial rating; (4) promotes smoother transitions from higher cost areas to lower cost areas; (5) can utilize data external to insurer database information, such as historical meteorological data, road statistics, etc.; and (6) accurate vehicle usage information with location rating factors.

According to this disclosure, GRID cells, which may also be referenced to as coordinate grid cells, grid cells, cells, coordinate grid block, grid blocks or blocks; are defined as non overlapping geographic areas defined by truncated latitude and longitude values, wherein the size of the GRID cells can vary depending on the level of truncation precision. A truncation example is provided that illustrates how the level of truncation can be used to capture more or fewer point locations, e.g., geographic locations, in a given GRID cell. The example in TABLE 1 has nine point locations that exist at the noted latitude and longitude coordinates. Each point is lettered and is accurate to six positions to the right of the decimal for both latitude and longitude.

TABLE 1

| Point Name | Latitude | Longitude | Premium |
| --- | --- | --- | --- |
| A | 42.221623 | −80.241321 | 145 |
| B | 42.224237 | −80.248427 | 225 |
| C | 42.226772 | −80.242043 | 412 |

TABLE 1-continued

| Point Name | Latitude | Longitude | Premium |
|---|---|---|---|
| D | 42.229623 | −80.242843 | 299 |
| E | 42.228791 | −80.247182 | 305 |
| F | 42.228423 | −80.238221 | 205 |
| G | 42.228911 | −80.251822 | 335 |
| H | 42.230879 | −80.249142 | 289 |
| I | 42.225291 | −80.236382 | 435 |

To develop a summarized amount of premium for a particular area (GRID cell), the absolute value of latitude and longitude for each point may be truncated at two decimal positions and grouped in a query of the database. These summaries are listed in TABLE 2.

TABLE 2

| Point Name | Latitude | Longitude | Premium |
|---|---|---|---|
| A | 42.22 | 80.24 | 145 |
| B | 42.22 | 80.24 | 225 |
| C | 42.22 | 80.24 | 412 |
| D | 42.22 | 80.24 | 299 |
| E | 42.22 | 80.24 | 305 |
| F | 42.22 | 80.23 | 205 |
| I | 42.22 | 80.23 | 435 |
| G | 42.22 | 80.25 | 335 |
| H | 42.23 | 80.24 | 289 |

With this level of truncation, the nine points fall into four different GRID cells, which are bounded by two decimal point precision latitude and longitude lines. Next, the points may be grouped according to the truncated latitude and longitude, as shown in TABLE 3.

TABLE 3

| Latitude | Longitude | Total Premium |
|---|---|---|
| 42.22 | 80.24 | 1386 |
| 42.22 | 80.23 | 640 |
| 42.22 | 80.25 | 335 |
| 42.23 | 80.24 | 289 |

The latitude and longitude coordinates are components of a unique identifier, GRID ID, which may be used to identify each GRID cell. The GRID ID may be determined by first taking the absolute value of the latitude and longitude coordinates, truncating the coordinates to a specified number of digits, eliminating the decimal point, and finally concatenating the resulting values together. The specified digits include three digits to the left of the decimal place in order to accommodate up to 180 degrees of longitude. The GRID ID matches the latitude and longitude of the lower right corner (the Southeast corner) of the GRID cell. The following transformation may be implemented in software as a grid cell determination means.

| Latitude | Longitude | | GRID ID |
|---|---|---|---|
| 42.22 | 80.24 | → | 0422208024 |

This example uses a single attribute to demonstrate the grouping, but incurred losses or other factors could also have been used. The truncation method can be used as part of an actuarial flow where total premium is compared to total losses and other factors to develop an appropriate rate for a grid area. The GRID ID may be represented as a single numeric value, e.g., 0422208024, or may be represented by its component parts, e.g., 04222 and 08024. While the examples provided show latitude and longitude represented in decimal format, other formats can provide the same function including, for example, degrees, minutes, and seconds.

At this point in the disclosure, reference to the figures may be helpful.

FIG. 1 illustrates a stylized town map overlaid with a coordinate grid, according to certain embodiments of the present disclosure. This map provides some context for the Map 100 and includes a 7×9 array of coordinate grid cells or blocks, locations A-F, river 101, highway 102, surface streets 103, neighborhoods 110, 111, and 112, and an example route 125 (shown in dotted line with arrowheads) travelled by a vehicle. It is to be understood that the term "vehicle" includes all types of vehicles, including, and not limited to, automobile, motorcycle, truck, bus, personal transporter (e.g., electripod), and boat. The coordinate grid includes gridlines at hundredths of a degree from 30.420N to 30.429N and from 97.270W to 97.277W. Note that a reference to a coordinate grid cell at (X, Y) will refer to the cell with a lower right corner at coordinate (X, Y). For example, highway 102 crosses river 101 in grid cell (97.272W, 30.425N). Locations A-F are each associated with a latitude/longitude coordinate pair. Each location A-F may represent a real property location to be insured, a physical location where personal property may be garaged or kept, or the location of historical data point (e.g., claim or crime scene).

River 101 is a body of water separating neighborhood 111 from 110 and 112. River 101 may represent other geological or geographical barriers like steep inclines or ravines. River 101 may represent a rail line or limited access roadway. These barriers may represent disparate data sets where, for example, neighborhood 110 may represent a collection of homes. In contrast, neighborhood 112 may include a mix of commercial and residential properties. Finally, neighborhood 111 may be an urban city center with high-rise offices and residences. When rating a vehicle insurance policy for a vehicle associated with location E (denoted by a square), data from locations where the vehicle is used (for example, travel route 125 traversing grids associated with locations C, F, and B) may be more relevant from an insurance rating perspective than data from where the vehicle is garaged, e.g., location E. This may be the case even though location B is farther from where the vehicle is garaged than location D.

In some embodiments, river 101 may represent a political border (e.g., between states or countries). Because insurance is regulated by political entities, namely each of the fifty United States plus the District of Columbia, data may be compartmentalized with a state's borders. This compartmentalization may be for accounting purposes and may be required by law or regulation.

Highway 102 is a major vehicle artery cutting through the center of the town and spanning river 101. Highway 102 may present a similar barrier as river 101. Highway 102 may also provide access to emergency services such as fire or police departments. Surface streets 103 are roadways, paths, or other means for surface transportation.

The exemplary route 125 that the vehicle may travel includes one or more surface streets 103 and the highway 102 for travelling from location E to location B (denoted by a square). The route 125 may be a commuting route or a delivery route. When rating a vehicle policy, data from locations, roads, neighborhoods, etc., encompassing or near the vehicle during its use may be more relevant than data from locations, roads, neighborhoods, etc., that the vehicle does not use or are not near.

Figure 2:
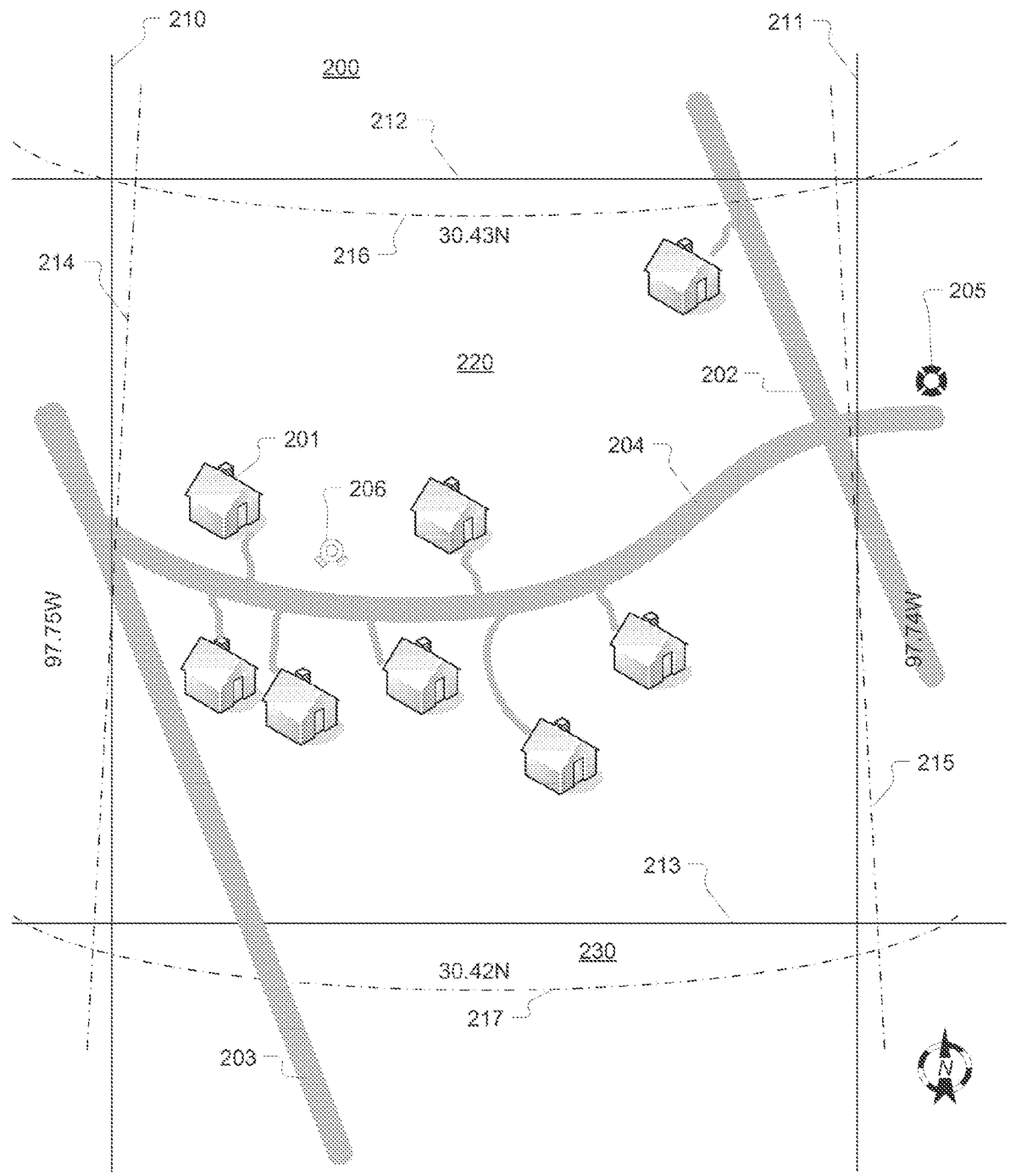
FIG. 2 illustrates a stylized neighborhood map with two different gridline representations, according to certain embodiments of the present disclosure.

FIG. 2 illustrates a stylized neighborhood map with two different gridline representations, according to certain embodiments of the present disclosure. Map 200 includes properties 201, roads 202, 203, and 204, fire station 205, fire hydrant 206, equidistant gridlines 210, 211, 212, and 213, and coordinate gridlines 214, 215, 216, and 217.

Properties 201 represent real estate structures subject to insurance rating, subject to insurance claims, and the locations for insurance-related events. Properties 201 are illustrated as detached, single-family residences, but may be any sort of real property. For example, some of these properties may be multi-family properties such as duplexes, triplexes, or condominiums Some properties may be adjoining town homes or row houses. Some properties may be mid-rise or high-rise apartments or condominiums Some properties may be zoned for residential, commercial, industrial, or municipal use. Some properties may be unimproved land in a natural state or subject to some other use. Properties 201 need not be homogenous as a single-family detached home and may be located next to a condominium project or next to a retail establishment.

Roads 202, 203, and 204 connect properties 201 to allow transportation of people, items, and vehicles between or past those properties. Roads 202, 203, and 204 are illustrated as uniformly sized residential roads, but may be any sort of road. Associated with the roads may be various road statistics, such as paved, unpaved, number of lanes, number of intersections, speed limit, lighting, guard rails, road grade, maintenance, average number of vehicles that travel the road at various times of day, distance to hospital, equipped with vehicle communications capability, etc. Further, some roads may be paved with asphalt, brick, concrete, or stone. Some roads may be made from gravel. Some roads may be dirt roads. Some roads may be pedestrian walkways or bike paths. Some roads may include dedicates lanes for motor vehicles and bicycles. Roads may have any number of lanes and may have painted stripes demarking lanes of traffic. The intersections of roads 202, 203, and 204 may include traffic control devices such as yield signs, stop signs, or traffic lights.

Fire station 205 and fire hydrant 206 represent insurance-related community services. Other services may include police stations and hospitals. Proximity to insurance-related community services may afford some protection against certain types of loss or may reduce the likely impact of certain events. For example, a nearby community police station may reduce the likelihood of certain property crimes. In another example, a nearby fire station may reduce the response time for emergency medical or fire assistance, thereby reducing the likelihood of medical complications or total loss of a property to fire.

Equidistant gridlines 210, 211, 212, and 213 illustrate one data segmentation approach, wherein a map is overlaid with a set of virtual gridlines spaced an equal distance from each other in a given direction. In this case, gridline 210 is 1000 m West of gridline 211 and gridline 212 is 1000 m North of gridline 213. This one kilometer grid (or a one mile grid) provides a well understood and easy to illustrate segmentation of zones on a map. In particular, equidistant gridlines 210, 211, 212, and 213 define GRID cell 220, which is roughly one square kilometer. One drawback of the equidistant grid is that any data point associated with a coordinate pair—defined as (latitude, longitude)—must be mapped into this equidistant grid system prior to analysis with other data points within the grid cell. For example, if property 201 at location (30.426N, 97.749W) is the subject of a rate quote, the rating system must first determine that location coordinate pair falls within GRID cell 220. Then the rating process may proceed.

Coordinate gridlines 214, 215, 216, and 217 illustrate another data segmentation approach, wherein a map is overlaid with a set of gridlines following longitudinal and latitudinal lines. (The term coordinate grid is used here to refer to latitude/longitude grid used by, for example, the United States Geological Survey.) The coordinate gridlines 214 and 215 follow the 97.75W and 97.74W longitudes, respectively. The coordinate gridlines 216 and 217 follow the 30.43N and 30.42N latitudes, respectively. These coordinate gridlines are spaced at two decimal places of the latitude/longitude coordinates, but other spacing may be appropriate as will be discussed below. In some embodiments, a variable spacing may be used wherein some data is accessed or processed according to a narrower spacing than other data. In certain embodiments, two or more sets of coordinate gridlines may be used for certain types of data or certain locations, e.g., where data density may vary significantly. In one example, property and/or vehicle related damage experience data may be dense in an urban location while climate data may be relatively sparse, suggesting that property and/or vehicle related damage experience data may be queried using a smaller coordinate cell size than climate data. In another example, property and/or vehicle related damage experience data may be sparse in a rural farming community suggesting that damage experience data may be queried using a larger coordinate cell size than in a dense urban situation.

The curvature of the illustrated coordinate gridlines is exaggerated to illustrate one major difference between this gridline system and the equidistant gridline system. Rather than form a square, the coordinate gridlines 214, 215, 216, and 217 form an oblong GRID cell 230, roughly 1100 meters tall following a longitudinal cross-section and roughly 960 meters across following a latitudinal cross-section. These distances are calculated based on the well-documented Haversine formula—though other formulas may be employed. This oblong shape will be more pronounced at higher latitudes, e.g., at 64.72N in Fairbanks, Ak. where the same two-decimal grid cell would be roughly 1110 meters by 480 meters. In some embodiments, the coordinate gridlines used at such extreme northern latitude may be adjusted to more closely approximate a square grid cell. This may be accomplished, for example, by defining a grid cell with corners at (64.72N, 147.48W) and (64.73N, 147.50W), or incrementing the latitude by 0.01 degrees while incrementing the longitude by 0.02 degrees.

Data Aggregation in the Ratemaking Process

GRID Based Rating utilizes latitude and longitude coordinates to establish a network of small territories or "GRID cells" or grid cells across a state or region. Each GRID cell represents a defined area, with corner points defined in terms of truncated latitude and longitude. Each vehicle insurance policy may be assigned to one or more GRID cells based on its latitude and longitude coordinates, which are determined based on usage of the vehicle by using reference or target locations associated with one or more routes that a vehicle may travel. It is to be understood that the present invention is applicable to more than just vehicle insurance and may be applied to others transportation means, e.g., motorcycles, trucks, boats, buses, and other forms of property and casualty insurance where GRID usage data may be captured.

The premium and loss experience used to calculate policy pricing may be derived from data associated with a target cell(s)—or the GRID cell(s) or grid cell(s) that encompasses the target location or route—as well as data, e.g., supplemental data, associated with surrounding, bordering, adjacent, or proximate GRID cells. The aggregate risk exposure is determined based on the data associated with each target cell and the immediately surrounding GRID cells. Certain embodiments incorporate an iterative search process using progressively larger data sets with each data set incorporating data associated with GRID cells that are progressively further from the target cell. This method may ensure that the most geographically relevant data is included in the calculations for each target location. GRID Based Rating uses this data to derive location rating factors (LRFs) for each GRID cell.

Figure 3A:
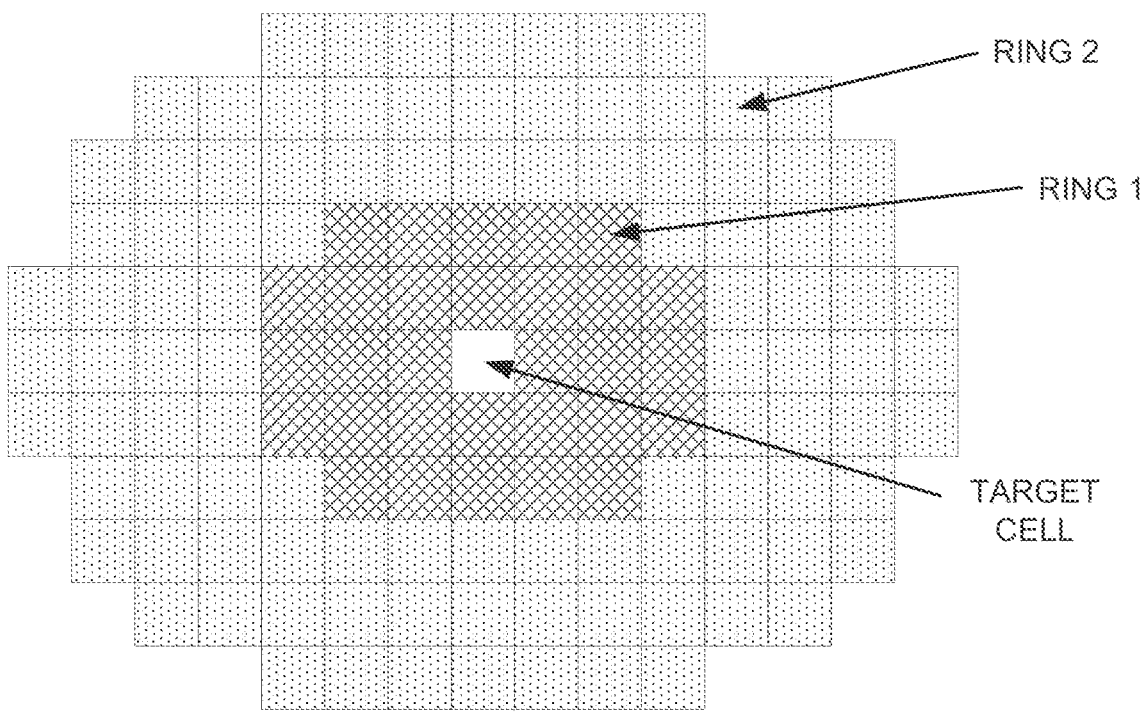
FIGS. 3A-3C illustrate three variations of a process of gathering progressively larger amounts of geographically relevant data from GRID cells.
Figure 3B:
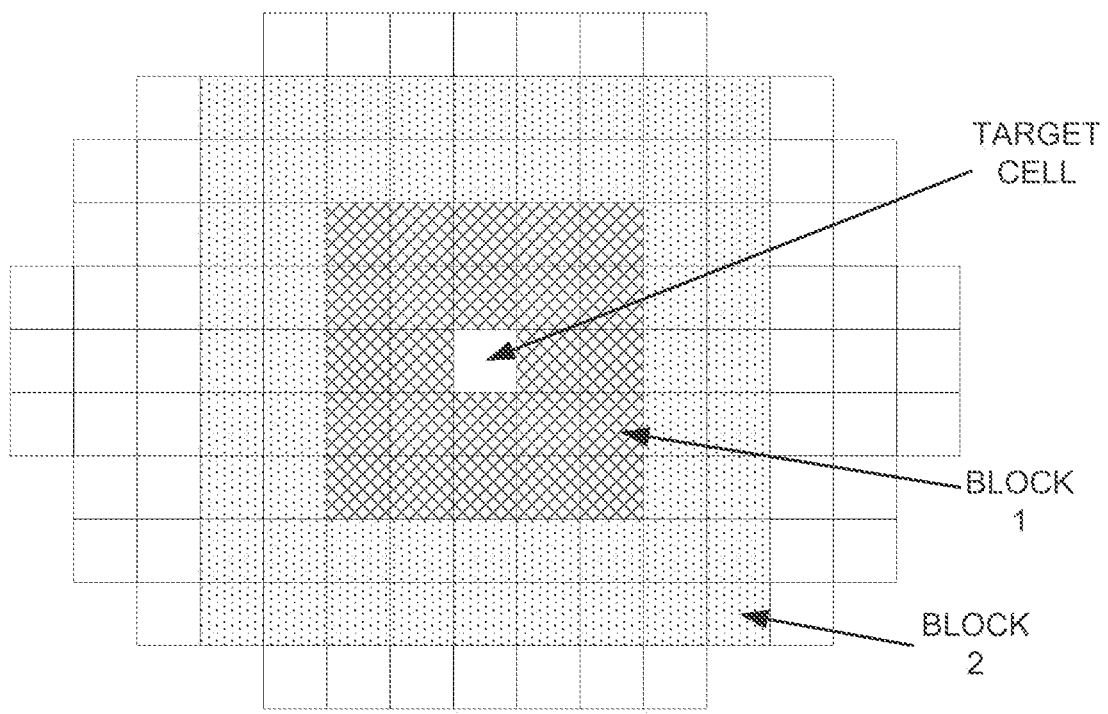
Figure 3C:
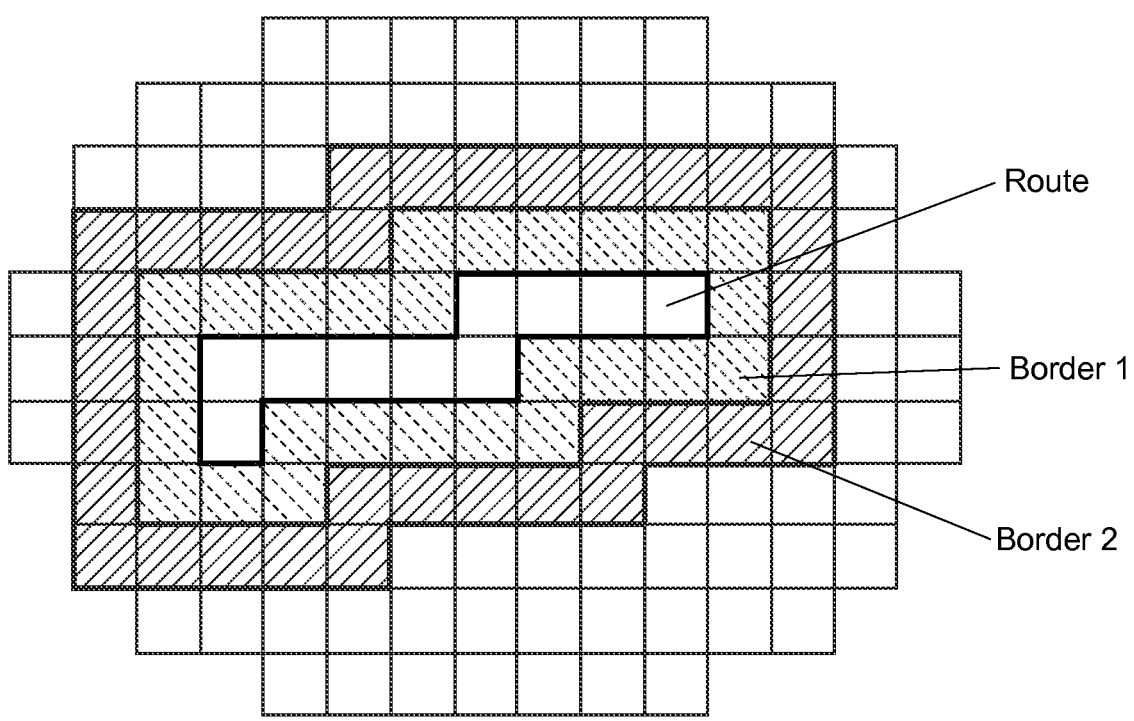

FIGS. 3A-C illustrate three variations of a process of gathering progressively larger amounts of geographically relevant data from GRID cells. These figures are oriented with the top of the page representing geographic North and the right side of the page representing geographic East.

FIG. 3A illustrates a process of gathering progressively larger amounts of geographically relevant data using concentric rings around a target GRID cell. FIG. 3A includes a target cell, ring 1 surrounding and contiguous with the target cell, and ring 2 surrounding and contiguous with ring 1. The number of rings and the size of each ring may vary to accommodate different data requirements, geographic anomalies, etc. In some embodiments, each ring includes an equal number of grid cells along both the North/South cross-section as with the East/West cross-section. In other embodiments, more or fewer grid cells may be included across a North/South cross-section than are included across an East/West cross-section in order to more closely represent equal geographic distance in each direction. Two rings are illustrated, but more or fewer rings may be utilized. In some embodiments, the target cell may be referred to as ring 0.

According to one aspect of the invention, there is a method having the following steps: collecting data for the target cell and determining whether the current data collection has enough historical data to provide actuarially credible results. If not, an iterative process is performed including collecting data from rings of GRID cells immediately surrounding the cell(s) for which data has been collected and evaluating at each iteration whether enough historical data has been collected. Once a credible set of data has been collected, distance weighting and credibility weighting are applied and a pure premium is calculated.

FIG. 3B illustrates an alternative process of gathering progressively larger amounts of geographically relevant data using concentric cells around a target cell. FIG. 3B includes a target cell, a block 1 of cells surrounding and centered on the target cell, and a block 2 of cells surrounding and centered on the target cell. While blocks 1 and 2 are illustrated as squares, each may be a rectangle to compensate for rectangular GRID blocks at high or low latitudes.

In certain embodiments, the iterative process first gathers data from the target cell and determines if additional data is needed to get a credible data set. If so, data is gathered from block 1 (including duplicate data from the target cell) and a distance weighting is applied. In certain embodiments, duplicate data may be explicitly excluded. In other embodiments, the duplicate data is left in the set for computational efficiency and any skew is lessened through the application of the distance weight. This process iterates until a sufficient amount of data has been collected to satisfy a credibility threshold.

In certain computational environments, the process illustrated in FIG. 3B may be preferable as it may be simpler and/or faster than the process illustrated in FIG. 3A because data may be queried with two boundary points (representing a rectangle) rather than a series of boundary points representing the more circular rings illustrated in FIG. 3B.

FIG. 3C illustrates an alternative process of gathering progressively larger amounts of geographically relevant data using bordering cells or blocks around a sequence of target cells. FIG. 3C includes a sequence of target cells that may be representative of a route travelled by a vehicle, border 1 surrounding and centered on the sequence of target cells, and border 2 surrounding and centered on the sequence of target cells. Alternatively, borders 1 and 2 may be determined using one of the processes illustrated in FIGS. 3A and 3B. In particular, one or more rings surrounding each target cell within the sequence of target cells, e.g., route, may be determined and the rings of each target cell may be compiled to determine one or more borders along the perimeter of the route.

In certain embodiments, the iterative process first gathers data from the sequence of target cells and determines if additional data is needed to get a credible data set. If so, data is gathered from border 1 (including duplicate data from the sequence of target cells) and a distance weighting may be applied. In certain embodiments, duplicate data may be explicitly excluded. In other embodiments, the duplicate data is left in the set for computational efficiency and any skew is lessened through the application of the distance weight. This process iterates until a sufficient amount of data has been collected to satisfy a credibility threshold.

Figure 4A:
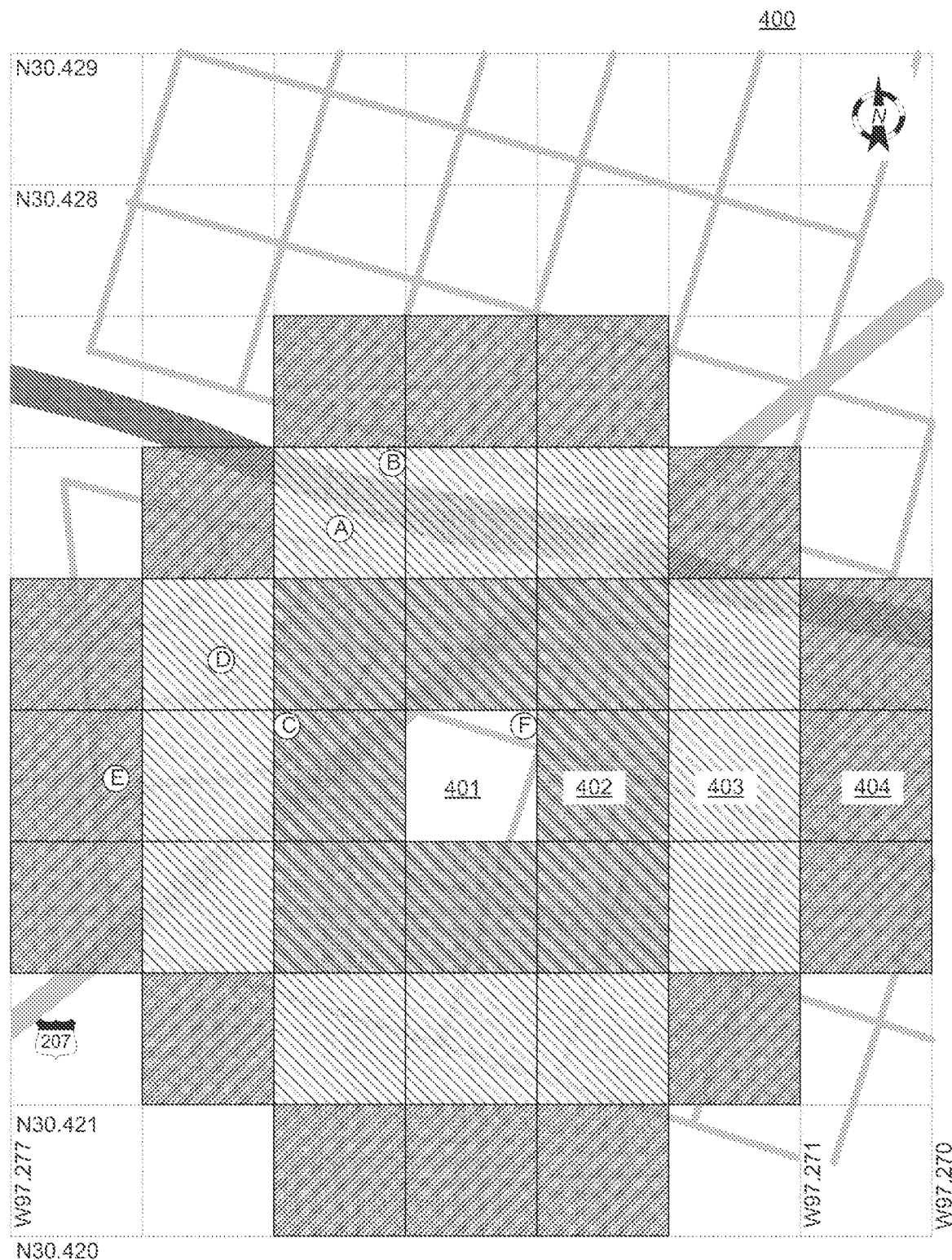
FIG. 4A illustrates a stylized town map superimposed with rings according to certain embodiments of the present disclosure.

FIG. 4A illustrates a stylized town map superimposed with rings according to certain embodiments of the present disclosure. Map 400 illustrates the same points of interest as FIG. 1 as well as target cell 401 and rings 402, 403, and 404. In this illustration, the target cell 401 includes a portion of the highway 102 of the route 125 travelled by the vehicle. If the standard ring-based method is utilized on the data set of this particular target cell 401, data associated with location C may carry more weight in the calculation of the location rating factor than data associated with garage location E because location C is in the first ring (ring 402) and location E is in the third ring (ring 404). In other words, the distance weighting will reduce the weight accorded to data associated with location E as compared to location C. In some embodiments, data may be associated with attributes. For example, police reports of numerous vehicle collisions at location C may be associated with an attribute of "traffic accidents." In another example, police reports of numerous vehicle thefts at location B may be associated with an attribute of "crime rate." In some embodiments, the query for data in a given cell or ring may include a Boolean filter to restrict results, e.g., "NOT 'vehicle collisions'" or "AND 'crime rate.'" In some embodiments, a post processing step may apply a lesser weight to results not associated with "crime rate."

Figure 4B:
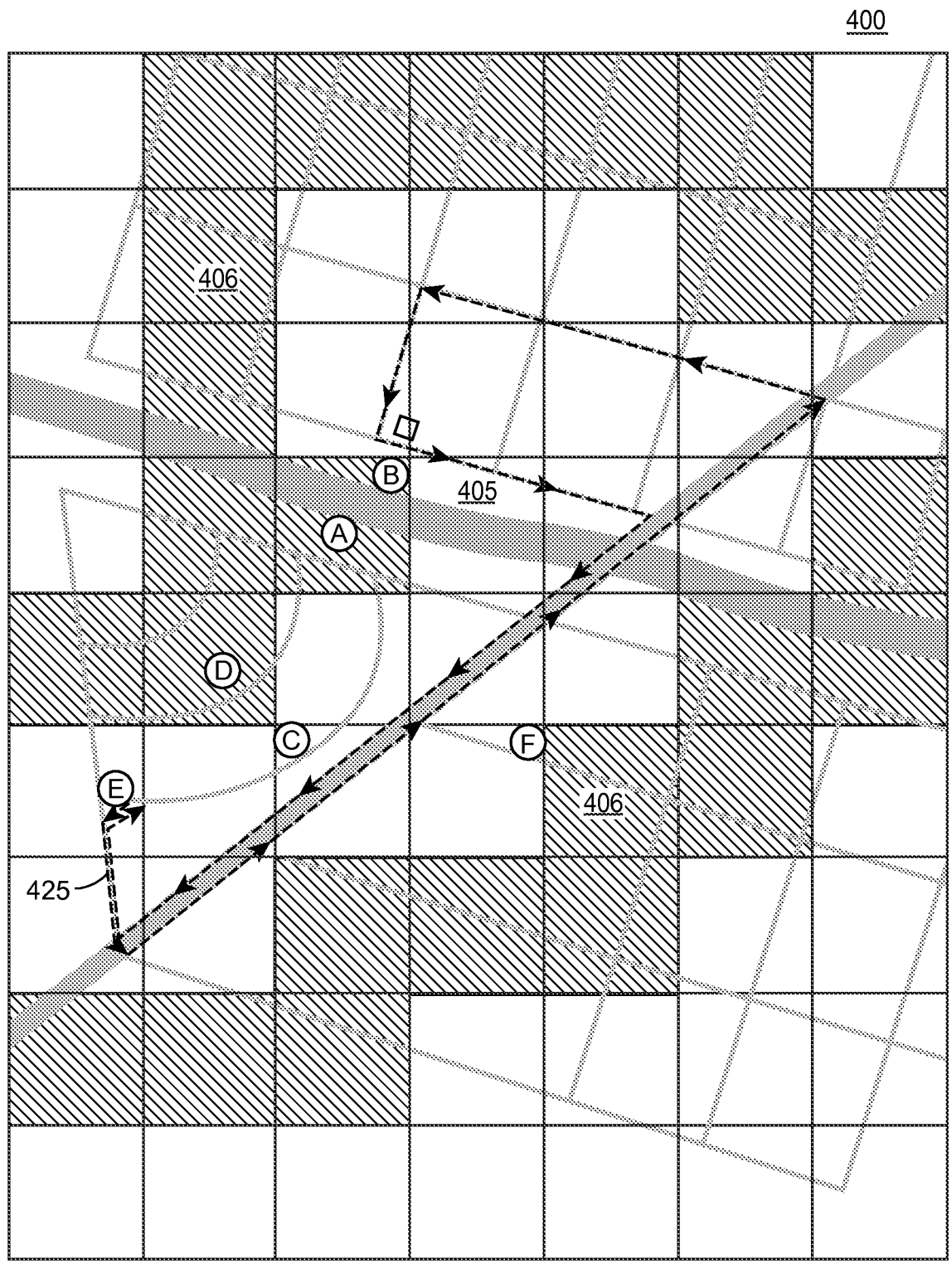
FIG. 4B illustrates a stylized town map superimposed with a border according to certain embodiments of the present disclosure.

FIG. 4B illustrates a transverse route 425 travelled by a vehicle through a mapped stylized town superimposed with borders according to certain embodiments of the present disclosure. In addition to the same points of interest illustrated in FIG. 1, Map 400 in FIG. 4B illustrates a sequence of target cells 405 encompassing the route 425 and a surrounding border 406. If the standard border-based method is utilized on this data set, data associated with location C may carry more weight in the calculation than data associated with location D because location C is in the sequence of target cells 405 and location D is in the border 406. The distance weighting will reduce the weight accorded to data associated with location D. Because some locations are more similar to other locations, certain techniques may be applied to filter the data based on relevancy criteria. In some embodiments, data may be associated with attributes. For example, a claim for vehicle related damage at location E may be associated with an attribute of "local driving." In another example, a claim for vehicle related damage on the highway 102 may be associated with an attribute of "interstate driving." In some embodiments, the query for data in a given cell or border may include a Boolean filter to restrict results, e.g., "NOT 'highway'" or "AND 'surface streets.'" In some embodiments, a post processing step may apply a lesser weight to results not associated with "surface streets."

Data Relevant to the Ratemaking Process

With an understanding of the generalized data gathering process, some elaboration is necessary as to the types of data relevant to ratemaking. In certain embodiments, one step of the method is to collect historical data on a given target GRID cell and all nearby GRID cells within a specified radius where the vehicle is used. In this step, an exposure adjustment may also be applied by peril (e.g., fire, crime, and other extended coverage). Data may be collected from a variety of sources both internal and external to the insurance provider. For example, data may be collected regarding fire station and fire hydrant locations and characteristics, weather data, government data, in particular census, tax, population, traffic, employment, businesses, crime statistics, soil, vegetation, flood plains, burn zones, etc.

Census data may be collected and include: population density, average number of vehicles per household, average travel time, and travel type (drive, car pool, public transportation, etc.). Census data may be obtained from third party vendors or other external sources. Fire station data may include: distance to responding fire station, distance to nearest fire station, fire station type (paid, volunteer, combination, other), and fire station characteristics (trucks, equipment, water supply, etc.). Fire Station data may be obtained from third party vendors or other external sources. Crime data may include: robbery counts, burglary counts, larceny-theft counts, motor vehicle theft counts, and arson counts. Brush fire data may include: brush fire potential, and vegetation index. Weather data may include: average number of hail events, average hail stone size per event, average number of tornado events, average tornado rating per event, average tornado length per event, average tornado width per event, average annual rainfall, average annual snowfall, average high temperature, average low temperature, and frequency of weather watches and warnings issued. Other data may include: traffic density, average driving distance, earth aspect (measures the amount of sunlight at a location), slope, fault lines, and soil type.

Telematic devices may also be attached to vehicles to collect usage information. For example, a position module, such as a global positions unit (GPS), may be attached to a vehicle to collect vehicle operation data, which may include: location, miles driven, moving time, non-moving time, total time within one of the plurality of grid cells, time when vehicle ignition is on, time when vehicle ignition is off, and vehicle velocity. The usage information may be provided to a computing device and/or stored at a memory device.

Historical data may be collected from data sources that are both internal and external to an insurance company. In some cases, data external to an insurance company may not be used because the data is randomly available within/across states and the data may have limited additional explanatory value.

Unless otherwise specified, average and statewide values may be treated as constants for the purposes of the present invention if those values remain constant for some period of time. In other words, if two policies that cover properties at two locations at opposite corners of a large state are rated at roughly the same time, any average or statewide value that remains the same in both rating calculations may be referred to herein as a constant. Similarly, if two policies that cover vehicles used at opposite corners of a large state are rated at roughly the same time, any average or statewide value that remains the same in both rating calculations may be referred to herein as a constant.

When data is collected from outside an insurance provider, the data may need to be mapped into the coordinate grid in order to speed lookup and simplify the required database queries. For example, the outside data may be initially associated with postal ZIP codes, street addresses, school districts, or any other geographic locations and regions.

Figure 5:
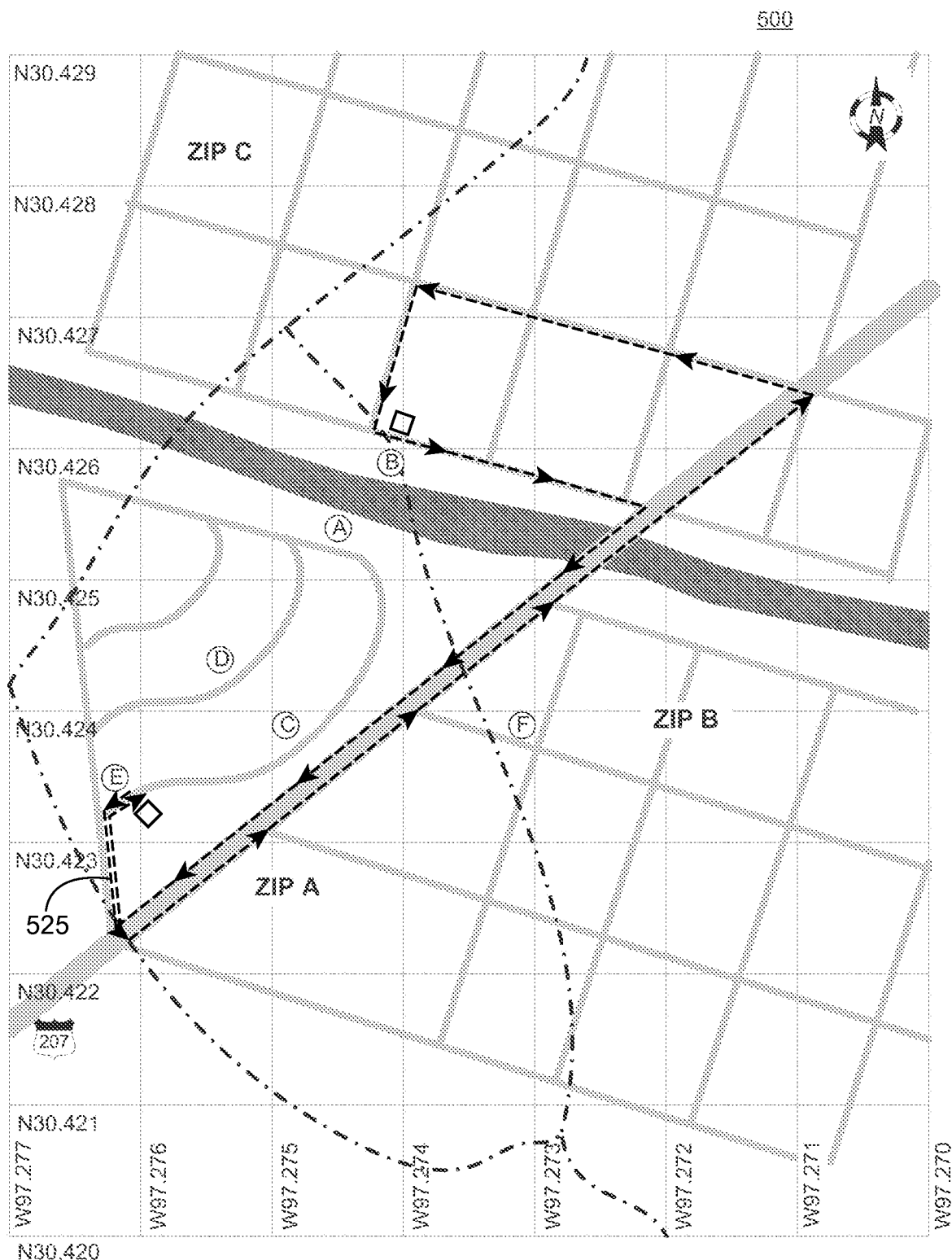
FIG. 5 illustrates the stylized town map overlaid with a coordinate grid and an alternative set of geographic boundaries, namely ZIP codes.

FIG. 5 illustrates the stylized town map overlaid with a coordinate grid and an alternative set of geographic boundaries, namely ZIP codes. Map 500 illustrates at least three ZIP codes—ZIP A is contained within map 500, and ZIP B and ZIP C each appear to extend beyond the edges of map 500. Map 500 illustrates how postal ZIP codes may not coincide with the coordinate lat/long grid. In one example, postal ZIP A is shown to completely encompass a number of grid cells, e.g., the grid cells encompassing each of locations C and D. ZIP A also includes portions of a number of other grid cells, e.g., a portion of the grid cell encompassing location E as well as a portion of route 525.

If data is associated with a ZIP code, rather than a grid cell, a grid-based query will not retrieve that data. For example, assume that ZIP A is associated with negligible levels of flammable vegetation, thus reducing the risk of a loss due to fire relative to homes in areas of higher levels of flammable vegetation. ZIP A may cover an urban area, while ZIP B may abut a forest. The data associated with ZIP A will be called the ZIP A Data. In order to perform a grid-based query, it is desirable to associate the ZIP A Data with one or more grid cells covered by ZIP A.

Figure 6:
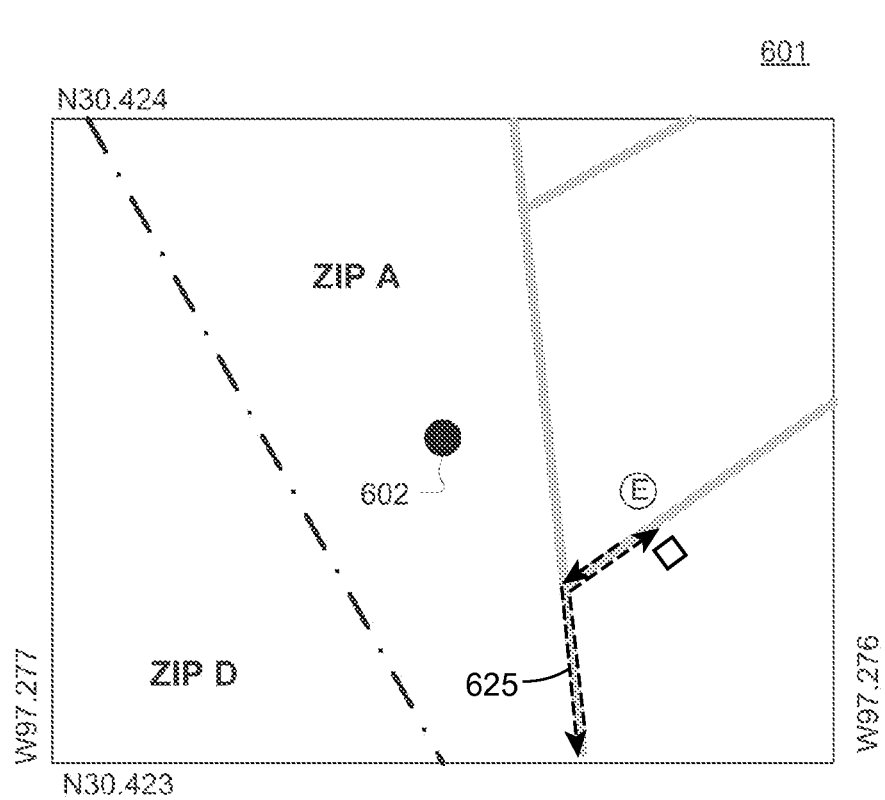
FIG. 6 illustrates various approaches to mapping data into a grid-based representation scheme.
Figure 6:
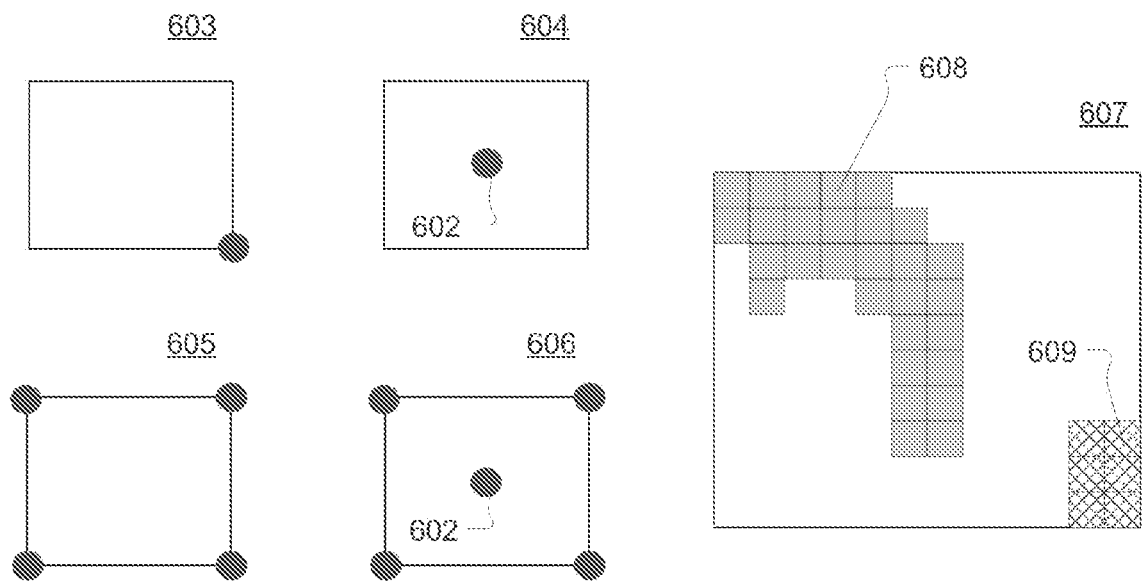

FIG. 6 illustrates various approaches to mapping data into a grid-based representation scheme. Specifically, FIG. 6 includes a zoomed in representation of a specific grid cell including location E and a portion of route 625, and further includes five separate abstract grid cells illustrating five means for mapping data into a grid cell. Grid cell 601 includes grid boundaries at N30.424, N30.423, W97.277, and W97.276, and center point 602 located at N30.4235, W97.2765. A boundary line between ZIP A and ZIP D intersects the grid cell illustrated in map 601. The GRID ID for this cell is 030423097276 assuming a GRID resolution of three decimal points. Grid cells 603-606 illustrate four example methods of mapping data into the grid cell, origin mapping 603, center point averaging 604, four corner averaging 605, five point averaging 606, and pixel counting 607.

Using origin mapping 603, a data value associated with ZIP A will be associated with cell 030423097276 because the origin of this cell (marked by a single dot) is within ZIP A. Using center point averaging 604 results in the same mapping because center point 602 is also in ZIP A.

Using four corner averaging 605, a numeric data value is retrieved for each corner of the grid cell with the average of the four points saved as the representative attribute of cell 030423097276. For example, if ZIP A is associated with an average vegetation coverage of 0.25 and ZIP B is associated with an average vegetation coverage of 0.60, then the average is 0.43 rounded to two decimal places. That average number would then be stored in the database in association with cell 030423097276.

Using five point averaging 606, a value is retrieved for the center point and each of the corners. The average of the five values is then associated with 030423097276. Here, the average of vegetation coverage values of 0.25, 0.25, 0.25, 0.60, and 0.60 is 0.39.

Using pixel counting 607, a portion of a raster map (e.g., from a graphic image file) is superimposed on a grid cell and aligned. The raster map may be a graphical representation of a topographical map or other graphically represented information. In this approach, each non-zero pixel within the grid cell boundaries is counted and the average coverage of the grid cell is applied to the value represented by the raster map. For example, in pixel counting 607, a total of 35 out of 120 pixels are shaded in the raster map. A total of 29 pixels 608 (shaded grey), covering approximately 24% of the 120 pixels in the grid cell, may be associated with a mask value of 0.045. A total of 6 pixels 609 (with crosshatching), covering 5% of the grid cell, may be associated with a mask value of 0.820. As a result, the average mask value is (0.045×0.24)+(0.820×0.05), or 0.052. In some embodiments, a minimum or maximum mask value may be associated with the grid cell.

Figure 7A:
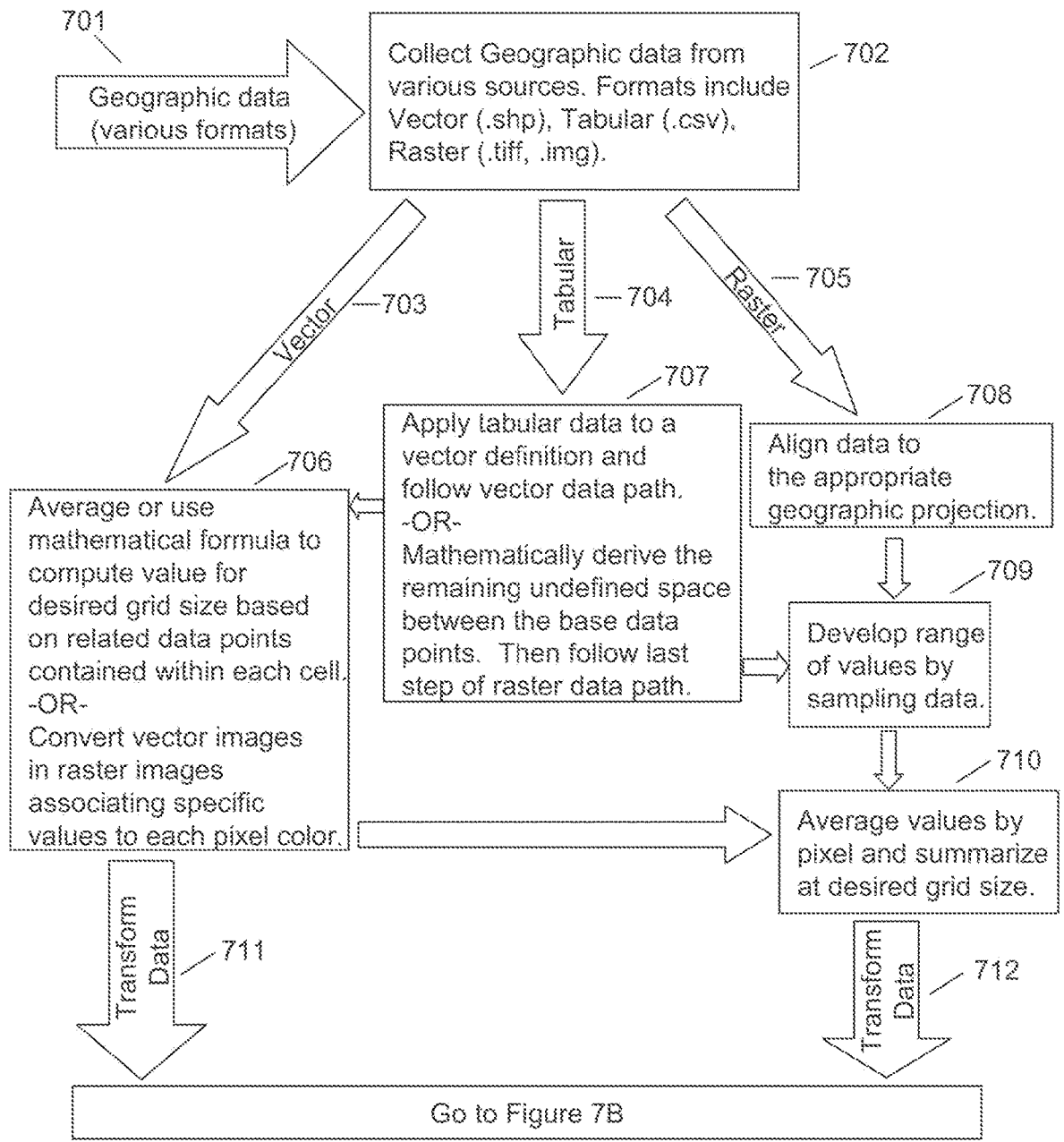
FIGS. 7A-7B illustrate processes for coordinating data with a GRID map according to an embodiment of the invention is disclosed according to a flow chart.
Figure 7B:
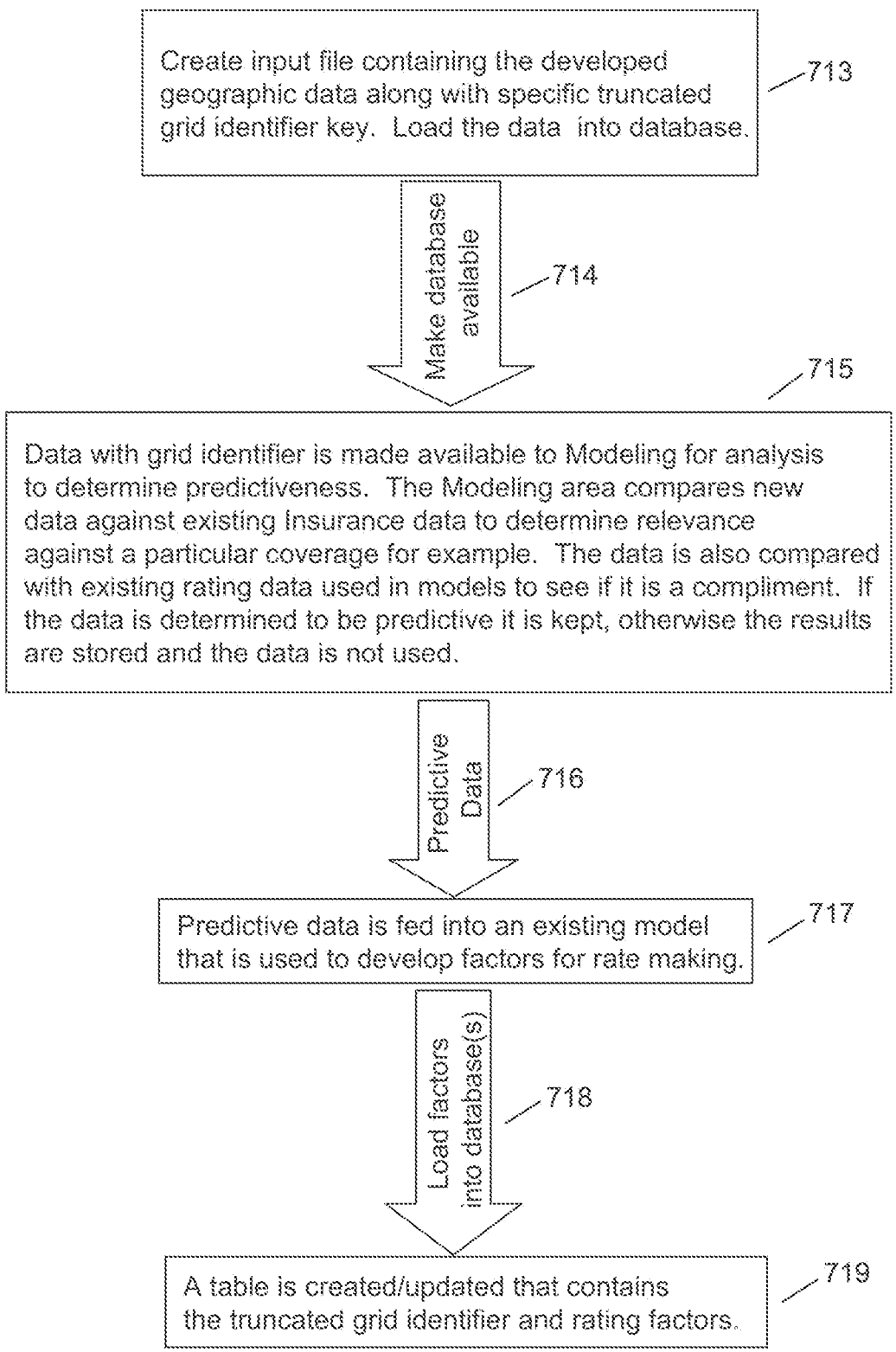

Referring to FIGS. 7A and 7B, processes for coordinating data with a GRID map according to an embodiment of the invention is disclosed according to a flow chart. Geographic data in various formats are identified in 701. The geographic data is being collected 702 from various sources. The formats may include Vector (.shp), Tabular (.csv), Raster (tiff, .img). For the Vector data 703, a mathematical formula (e.g., using methods 603-606) may be applied 706 to compute a value for a grid based on related data points contained within each GRID cell. Alternatively, the Vector images 703 may be converted 706 into Raster images associating specific values to each pixel color (e.g., using method 607). The collected tabular data 704 may be applied 707 to a Vector definition and then one can follow a Vector data path. Alternatively, the tabular data 704 may be mathematically derived so that the remaining undefined space between the base data points is obtained. The result of the process of step 707 may then be applied to step 706 as described above or to step 709 as described below. The Raster data 705 may be aligned 708 to the appropriate geographic projection. Next, both the aligned Raster data 705 and the applied tabular data 704 may be used to develop a range of values by sampling data 709. The sample data may then be used to obtain average values by pixel and summarized at desired grid size at step 710. At this stage, all of the Vector 703, tabular 704, and Raster 705 data may then be transformed as steps 711 and 712. An input file is then created 713 containing the developed geographic data along with a specific truncated grid identifier key. The data is then loaded into the database. The database is then made available 714. The data with grid identifier is then made available 715 to modeling for analysis to determine predictiveness. The modeling area compares new data against existing insurance policy data to determine relevance against a particular coverage for example. The data is also compared with existing rating data used in models to see if it is a complement. If the data is determined to be predictive, it is kept, otherwise the results are stored and the data is not used. The result is the predictive data 716. The predictive data may be fed 717 into an existing model that is used to develop factors for rate making. The factors 718 are loaded into databases. A table is then created/updated 719 that contains the truncated grid identifier and rating factors.

Figure 7C:
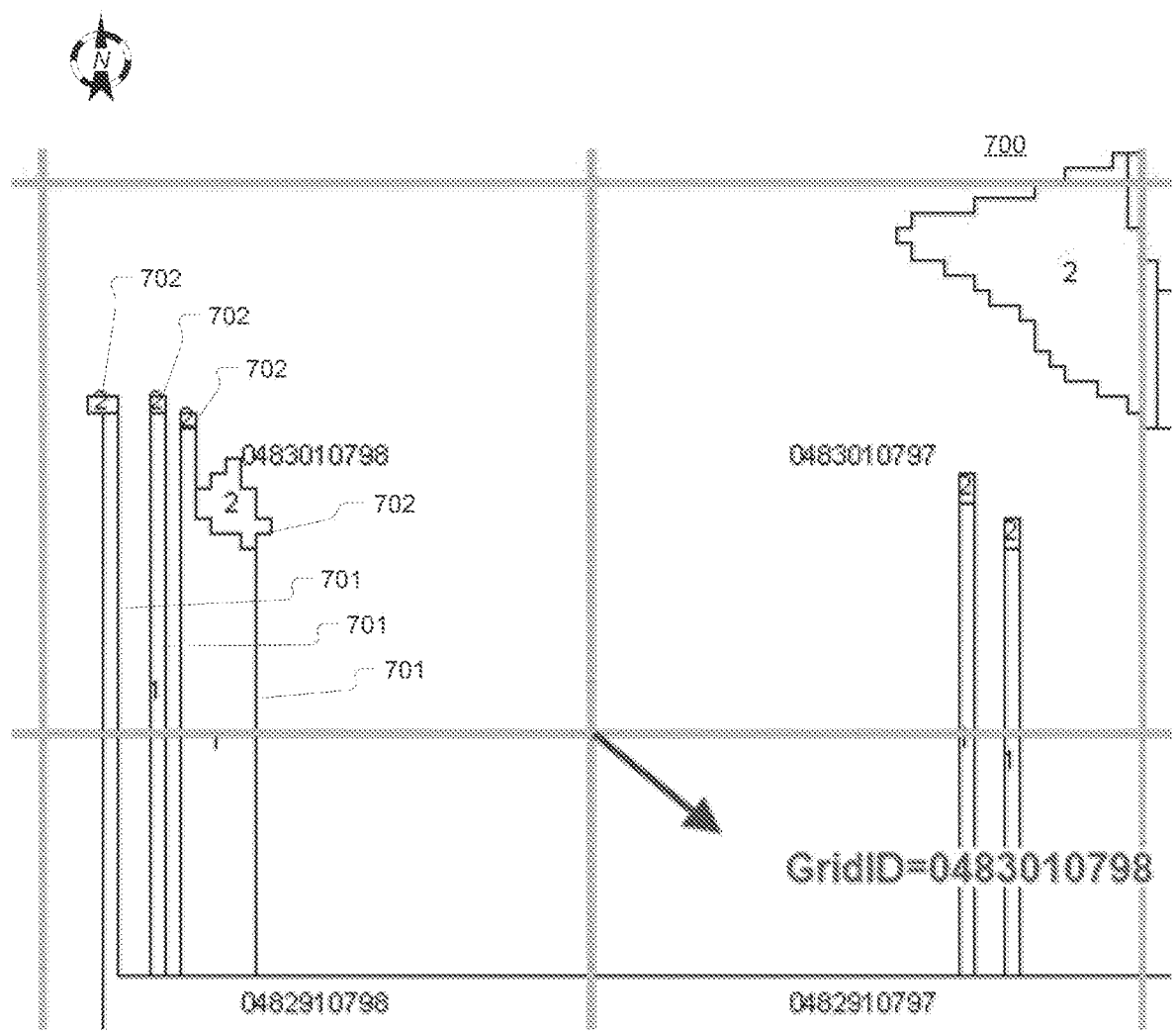
FIG. 7C illustrates an example of graphical information to be mapped into a GRID-based data structure.

FIG. 7C illustrates an example of graphical information to be mapped into a GRID-based data structure. While the following description refers specifically to a brush fire risk, the techniques can be applied to any data element in order to assign specific data values to GRID cells, such as locations with high amounts of vehicle collisions, poor roads, uninsured drivers, for example. The insurer has been provided with data for states that have exposure to Brush Fire risk. The Brush Fire Risk at a particular location considers several factors, including elevation, vegetation, land cover, etc., in addition to assigned risk values to areas in the state. The insurer has been provided maps of several states that show polygons and associated Brush Fire risk values. Risk values are 1, 2, 3, and 4. As the data provided is not by GRID, but rather by polygons of different sizes and shapes in a graphical information format, this document explains several methods to assign polygon risk values to GRID cells. A common geographical information system (GIS) file format is addressed herein as a non-limiting examples: Geospatial boundary files in GSB format and MapInfo® files.

Data provided from certain sources are converted to GSB files. User Defined Functions in insurer data stores utilise the GSB files to perform spatial look ups on latitude and longitude values and subsequently return the risk values associated with the polygon that contains the specified latitude and longitude coordinates. A single GRID cell covers a range of potential latitude and longitude coordinates. Thus, any GRID cell could contain coordinates that fall into one or more polygons, and thus the algorithm could return one or more risk values. As a result, several approaches have been examined to determine the best method to derive a single risk value for any given GRID cell.

Alternatively, data may be provided in, or converted to, a MapInfo® file, to determine the area covered by each GRID and the associated Risk Values. When multiple polygons span a GRID cell, the GRID cell is assigned the risk value associated with the polygon that is represented by the largest area in the GRID cell. For example, the map depicted in FIG. 7C shows a GRID cell that is spanned by multiple polygons.

In map 700, the grid cell with GRID ID '0483010798' is spanned by seven polygons, three with a risk value of 1 (701) and four with a risk value of 2 (702). The area covered by each polygon spanning GRID '0483010798' is given in Table 4.

TABLE 4

| Polygon | Risk Value | Polygon Area |
|---|---|---|
| 1 | 2 | 0.000490051 |
| 2 | 2 | 0.000245184 |
| 3 | 2 | 0.000245026 |
| 4 | 2 | 0.003919830 |
| 5 | 1 | 0.005148140 |
| 6 | 1 | 0.005148140 |
| 7 | 1 | 0.284706000 |

Thus, upon summing the polygon areas, a risk value of 1 is assigned to GRID '0483010798'. An alternative related method could use the risk values and the polygon areas to develop a weighted average risk value for the GRID cell.

Gather Sufficient Data to Generate Actuarially Credible Results

With rating data stored in association with each GRID cell, the rating process can begin with a data collection means. The process starts at the target GRID cell(s), as that data is typically the most relevant to the rating process. In many cases, a target GRID cell by itself will not have adequate experience to produce an actuarially credible result so nearby data will be gathered as needed. According to one embodiment, the rating system collects loss/exposure data in ring or border increments until the query scope first reaches a maximum distance (e.g., a selected radius from the target GRID cell) or includes sufficient data to attain maximum credibility. In an iterative approach, the system makes a determination for each GRID cell ring or border increment as to whether the data gathered is adequate to produce a credible result. The ring or border is incremented as needed up to the threshold ring or border distance.

Because most rating calculations will include data from GRID cells surrounding the target GRID cell or bordering the sequence of target GRID cells, calculations will tend to overlap. In other words, experience data in a given GRID cell will be used in the calculations for many nearby GRID cells. This data sharing helps to ensure a smoother transition of LRFs across adjacent GRID cells. In certain embodiments, an exception to this process is that GRID cells near certain boundaries (e.g., political or geographical) prevents the system from crossing those boundaries to gather data.

This iterative approach is illustrated in FIGS. 3A-3C and 4A-4B. FIGS. 3A and 3B illustrate a target GRID cell, a first ring of cells, and a second ring of cells. FIG. 3C illustrates a target sequence of target GRID cells (e.g., route), a first border of cells, and a second border of cells. FIGS. 4A and 4B show the stylized town map and overlaid coordinate grid 400 as shown in FIG. 1. FIG. 4A shows an overlaid series of GRID cell rings according to certain embodiments of the present invention. Target GRID cell 401 is located near the center of the map. A first ring of GRID cells 402 is located around the target GRID cell 401. A second ring of GRID cells 403 is located around the first ring of GRID cells 402. A third ring of GRID cells 404 is located around the second ring of GRID cells 403. For this particular GRID ring configuration, location F resides within the target GRID cell 401. FIG. 4B shows an overlaid GRID cell border according to certain embodiments of the present invention. The sequence of target GRID cells 405 is located near the center of the map and include those GRID cells that include or contain at least a portion of the route 425. A first border of GRID cells 406 is located around the sequence of target GRID cells 405 and denoted by GRID cells having diagonal lining within. Although not shown, it is to be understood that additional borders of GRID cells may be located around the first border of GRID cells 406. For this particular GRID border configuration, the route 425 resides within the sequence of target GRID cells 405. Thus, FIGS. 3A-3C and 4A-4B illustrate how the use of GRID cell ring and border increments may be used to gather an actuarially credible amount of data needed to rate a policy in the target GRID cell and/or the sequence of target GRID cells.

Credibility

This process of aggregating sufficient data to make a reliable and accurate risk assessment has been discussed above. In certain embodiments, this process is aided by the use of a well-known credibility formula, which is:

$$C = ZR + (1-Z)H$$

where:
R is the mean of the current observations (for example, the data)
H is the prior mean (for example, the estimate based on the actuary's prior data and/or opinion C is the [insurance rate]
Z is the credibility factor, satisfying $0 \leq Z \leq 1$.

T. Herzog, *Credibility: The Bayesian Model Versus Buhlmann's Model*, 41 Transactions of Society of Actuaries 43-88, at 43 (1989) (herein incorporated by reference). The credibility factor Z is defined by:

$$Z = \frac{n}{(n+k)} \qquad (4.1)$$

and satisfies $0 \leq Z \leq 1$; also, n is the number of trials or exposure units, and $$k = \frac{\text{expected value of the process variance}}{\text{variance of the hypothetical means}} \qquad (4.2)$$

Herzog, at 53. The basic principle is that the credibility of the rate increases with quantity n or $N_z$ of relevant expected claims or exposure units. The credibility factor may also be calculated as a function of the expected number of claims ($N_z$) the full credibility standard ($N_f$).

$$z = \sqrt{\frac{Nz}{Nf}}$$

G. Ventner, "Classical Partial Credibility with Application to Trend," *Proceedings of the Casualty Actuarial Society Casualty Actuarial Society* at 31 (1986) (herein incorporated by reference).

Adjust Historical Data for Distance

Because geographically distant data may be less relevant to the rating process than geographically near data, certain embodiments of the present disclosure may include a step of applying a distance weighting algorithm to discount or devalue data as a function of distant from the target cell or the sequence of target cells. Thus, the method of these embodiments relies more heavily on the immediately adjacent GRID cell experience than on distant GRID cell experience. However, this weighting process may be more relevant to certain perils or coverages than others.

In the case of automobile insurance, calculations may be carried out on each major coverage to develop an initial indicated LRF by coverage. These amounts are then credibility weighted to develop the final indicated LRFs by coverage.

For any insurance product with low exposure, special considerations may be warranted. For example, losses may be capped in various ways to mitigate the impact of shock losses or events. In some embodiments, losses may be capped based on the dollar amount incurred or paid over a specified period of time. For example, losses incurred or paid over a day, week, year or any other relevant period of time can be used in the analysis.

In other embodiments, individual claims may be capped at a specified threshold or otherwise removed to limit their impact on the final indicated LRFs.

In other embodiments, it may further be appropriate to cap actual losses per policy, i.e., pure premium, at a specified multiple of the complement of credibility. Table 5 provides an example.

TABLE 5

| Data Item | Value |
| --- | --- |
| Loss | $167,090 |
| Common Risk Exposure | 10.83 |
| Loss Pure Premium | $15,434.11 |
| Statewide Loss Pure Premium | $ 81.63 |
| Capped Loss Pure Premium | $ 326.52 |
| Credibility Standard | 1,250.00 |
| Claims | 4.00 |
| Credibility Factor | 0.0566 |
| Model Loss Pure Premium | 90.20 |
| Relativity | 11.738 |
| Relativity with Capped Pure Premium | 1.269 |

Losses in the above table and throughout this document may or may not include loss expenses and may or may not include losses due to catastrophic events. Losses and loss expenses may also be on a paid, case incurred, or total incurred basis.

Apply Credibility Weighting

A further step of the process may be to apply credibility weighting using an appropriate credibility complement. Peril credibility standards may be developed based on accepted methodologies. Credibility standards may be based on confidence intervals and acceptable error thresholds.

Calculate Pure Premiums

Yet another step of the process may be to calculate pure premiums for each target GRID cell. For example, expected pure premium may be calculated by peril or coverage and then aggregated to an all-peril or all-coverage basis. In addition, premiums may be calculated for each GRID cell within a sequence of GRID cells and then aggregated, averaged, adjusted to a coverage basis.

According to an embodiment of the invention, pure premiums may be calculated using a provision that represents a long term average loss per exposure or alternatively be set to another appropriate provision, such as setting them equal to statewide pure premiums. Then, the peril or coverage pure premiums may be aggregated to an all-peril or all-coverage basis.

According to an embodiment of the invention, exposure may be adjusted to account for any distributional differences in rating variables across a state or geographic area. Peril or coverage specific adjustment factors may be used. An average GRID cell adjustment may be calculated relative to an average statewide adjustment. For example, Table 6 illustrates an example process to develop exposure adjustments for two GRIDs.

TABLE 6

| GRID | Exposure Count | Deductible (1) Value | Deductible (1) Adjustment | Road Type (2) Value | Road Type (2) Adjustment | (¹) * (²) |
| --- | --- | --- | --- | --- | --- | --- |
| 0369010450 | 10 | $500 | 1.25 | City | 1.00 | 1.2500 |
| 0369010450 | 20 | $500 | 1.25 | Highway | 0.85 | 1.0625 |
| 0369010450 | 20 | 1% | 1.00 | City | 1.00 | 1.0000 |
| | | | | GRID Weighted Avg. | | 1.0750 |
| 0369010451 | 20 | $500 | 1.25 | City | 1.00 | 1.2500 |
| 0369010451 | 10 | $500 | 1.25 | Highway | 0.85 | 1.0625 |
| 0369010451 | 40 | $1,000 | 1.05 | Highway | 0.85 | 0.8925 |
| 0369010451 | 25 | 1% | 1.00 | City | 1.00 | 1.0000 |
| 0369010451 | 15 | 2% | 0.90 | Highway | 0.85 | 0.7650 |
| | | | | GRID Weighted Avg. | | 0.9800 |
| | | | | State Weighted Avg. | | 1.0097 |

The above example assumes only two GRIDs exist in the state. Table 7 provides the weighted adjustment and the exposure adjustments for the two illustrative GRIDs of Table 6.

TABLE 7

| GRID | Weighted Adjustment | Peril Exposure Adjustment |
| --- | --- | --- |
| 0369010450 | 1.0750 | 1.0647 |
| 0369010451 | 0.9800 | 0.9706 |
| Statewide | 1.0097 | 1.0000 |

Develop Location Rating Factor

A further step of the process may be to develop an indicated Location Rating Factor.

Process Steps

Figure 8A:
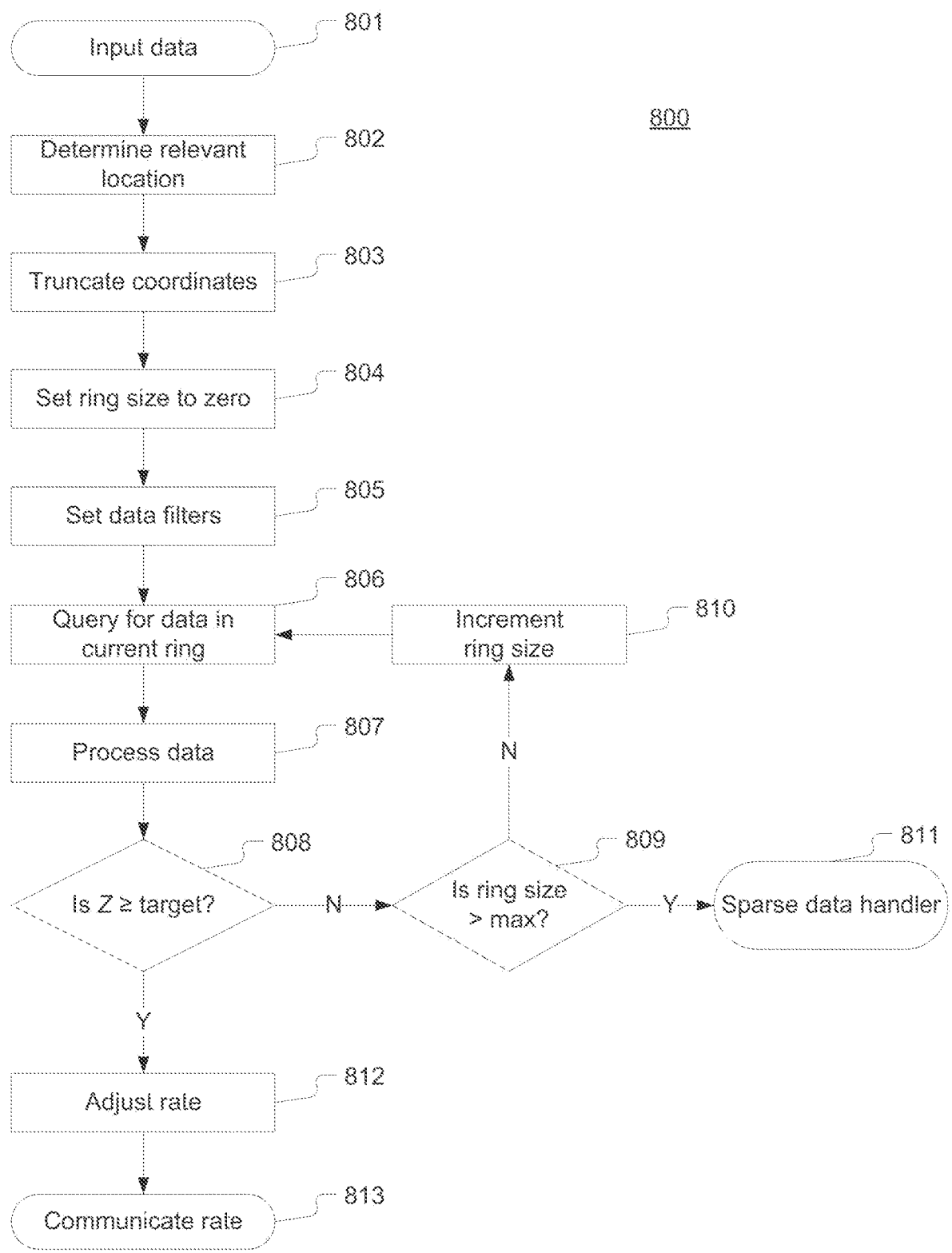
FIG. 8A provides a flow chart, which is illustrative of an embodiment of the invention.

FIG. 8A provides a flow chart, which is illustrative of an embodiment of the invention. Flow chart 800 illustrates an example flow of steps taken to develop a pure premium. Data is input 801 into a database, so that a table of all the GRID cells for a particular state is maintained in a separate database table. Other data may also be input into the system to be used for the analysis, such as grid level data, policy level data, and latitude and longitude level data. The location of the relevant person, property or thing being insured is then determined 802 and an initial selection of the corresponding GRID cell is identified. Longitudinal and latitudinal coordinates are then truncated 803 depending on how the GRID has been truncated for this area. The ring of GRID cells is set or initialized 804 to zero, which will result in a query for data in the target cell. In some embodiments, the ring size is initialized to one after data has been queried for the target cell.

Data filters may be set 805 to restrict the query to relevant data. Filters may be incorporated into a database query string, or may be applied to the query results. Filters may, for example, restrict the query to data relevant to:

types of claim, e.g., auto claims;

specific perils, e.g., data associated with a fire hazard, collision;

types of properties and/or vehicles, e.g., single-family residence, commercial property, or vacation home; automobile, truck;

classifications of properties and/or vehicles, e.g., standard homes, mobile homes, or high-rise homes, sedan, SUV;

features of properties, e.g., construction material, size, construction cost, waterfront, elevation, or neighborhood characteristics, vehicle safety features, e.g., anti-lock braking system, air-bags; or geographic or political subdivisions, e.g., limited to a state, county, or regulatory district.

The last item listed is of some importance with certain regulated products. Some insurance and financial services products are regulated by local or regional governmental entities. For example, regulation of certain insurance products is performed by state agencies in the United States. These entities may be referred to as regulators. In some embodiments, the database may contain generalized rules and criteria that apply to all policies and specific rules associated with a particular regulator. This arrangement of data would allow, for example, a single computational process to generate a rate for an insurance policy for a property in any state.

Data corresponding to the ring of GRID cells is queried 806. To query 806 the data, a temporary table of data is created for the data existing at the latitude/longitude level. The temporary data is summarized at the level of desired truncation and maintained until the completion of the analysis, since it is reused in each iteration. A query uses the input cell and determines via query which of the other cells in the state fall within the ordered rings up to the maximum distance, for example, 30 miles. Once the data for the other GRID cells are ordered, they are iterated through until a level of credibility is met, using the summarized data. Query 806 produces a target set of data that is associated with the target cell and/or current ring.

The target set of data is then processed 807, once the level is met the values retrieved and weighted based on the GRID ring, by loading the data into an overall calculation that develops a value for Ring 0. A determination 808 is then made as to whether the processed data is greater than or equal to the maximum credibility or target credibility. If the credibility of the processed data is not greater than or equal to the maximum credibility or target credibility, then a determination 809 is made as to whether the size of the ring of GRID cells has reached a maximum. If the size of the ring of GRID cells has not reached a maximum, then the ring size is incremented 810 by one and the process returns to the query step 806. If the size of the ring of GRID cells has reached a maximum, then a sparse data handler is used to calculate a rate. The process is continued for each GRID cell within a set of latitude/longitude boundaries, for example, defined by a state. If the processed data of step 807 is determined 808 to be greater than or equal to the maximum credibility or target, then a rate is adjusted 812. In some cases, the resulting rate values created are just a portion of the potential rate that would be presented to a customer because there are many factors that may come into play in calculating the final rate. Additional steps may also be added to modify the rate before it is communicated to a customer. Finally, a rate may then be communicated 813 to the potential customer for whom the policy rate quote has been requested.

Sparse data handler 811 provides a mechanism for addressing rating requests that cannot be completed normally as a result of insufficient rating data. In certain embodiments, sparse data handler 811 returns an error message signaling an inability to calculate a pure premium. In some embodiments, the error message may include the calculated pure premium information along with the credibility factor.

Example

As a further example of one aspect of the invention, specific data is provided to illustrate a method having the following steps: collecting data according to GRID rings, determining whether rings have enough historical data to provide actuarially credible results, adjusting the data for distance, and applying credibility weighting. The calculations herein represent a rating means, according to certain embodiments of the present disclosure.

First, historical data may be collected for GRID ring 0 (target GRID). Table 8 illustrates a data collection for claims and loss and loss expenses (referred to below as Loss Amount) for an exemplary target GRID.

TABLE 8

| GRID Ring | Claims | Loss Amount |
| --- | --- | --- |
| 0 | 8 | $20,640 |
| Total | 8 | $20,640 |

Second, historical data may be collected for GRID ring 1. This GRID ring may be for an interval ring having an inside and outside radius at selected distances from the target GRID cell. Table 9 illustrates a data collection for claims and loss and loss expenses for the exemplary target GRID and the exemplary GRID ring 1.

TABLE 9

| GRID Ring | Claims | Loss Amount |
| --- | --- | --- |
| 0 | 8 | $20,640 |
| 1 | 23 | $64,519 |
| Total | 31 | $85,159 |

Historical data may also be collected for GRID ring 2. This GRID ring may be for an interval ring having an inside and outside radius at selected distances from the target GRID cell, but lying outside and surrounding GRID ring 1.

Table 10 illustrates a data collection for claims and loss and loss expenses for the exemplary target GRID, the exemplary GRID ring 1, and the exemplary GRID ring 2.

TABLE 10

| GRID Ring | Claims | Loss Amount |
| --- | --- | --- |
| 0 | 8 | $20,640 |
| 1 | 23 | $64,519 |
| 2 | 93 | $247,717 |
| Total | 124 | $332,876 |

Loss and exposure data may be collected for additional interval rings until maximum credibility is obtained or a maximum distance is reached. In this illustrative example, maximum credibility is obtained with data for only seven GRID rings being collected.

Table 11 illustrates a data collection for claims and loss and loss expenses for the exemplary target GRID (GRID ring 0) and the exemplary GRID rings 1-6.

TABLE 11

| GRID Ring | Claims | Loss Amount |
|---|---|---|
| 0 | 8 | $20,640 |
| 1 | 23 | $64,519 |
| 2 | 93 | $247,717 |
| 3 | 160 | $404,077 |
| 4 | 206 | $581,755 |
| 5 | 348 | $955,226 |
| 6 | 414 | $1,095,219 |
| Total | 1,252 | $3,369,154 |

While the loss and exposure data above is illustrative for one peril or coverage, data may be collected in the same manner for any peril or coverage.

Third, a distance weighting factor may be applied to the loss and exposure data. For this particular example, as shown in FIGS. 9A and 10A, the weighting factor is about 1 for GRID rings 0-3 and GRID rings 0-8, respectively, and then the weighting factor decreases towards zero. Weighting factors may follow any function or curve shape. The weighting factor may even be truncated or it may increase with distance from the target GRID.

Fourth, credibility weighting may be applied using an external data model result, statewide pure premium, prior indicated factor, factor implied by current rate, or any other relevant value as the complement. Credibility standards may be based on varying confidence intervals and acceptable error thresholds.

Fifth, pure premiums may be calculated by peril for expected loss and loss expenses. The loss and loss expenses may be divided by the exposure to determine the loss and loss expenses pure premium. Illustrative results are provided in Table 12 for one peril.

TABLE 12

| Data Item | Value |
|---|---|
| Loss | $818,851.12 |
| Common Risk Exposure | $ 4,280.14 |
| Loss Pure Premium | $ 191.31 |
| Capped Loss Pure Premium | $ 191.31 |
| Credibility Standard | 1,250 |
| Claims | 313 |
| Credibility Factor | 0.50 |
| Model Loss Pure Premium | $ 186.29 |
| Expected L&ALAE PP | $ 188.80 |

An expected loss and loss expenses pure premium may also be calculated based on a provision that represents a long term average loss per exposure or alternatively be set to another appropriate provision, such as setting them equal to statewide pure premiums.

Sixth, pure premiums for the various perils or coverages may be aggregated to an all—peril or all—coverage basis.

Seventh, the all-peril or all-coverage pure premiums can then be used to derive an indicated Location Rating Factor.

Example—Vehicle GRID (Geographic Rating ID) Rating Methodology

According to one exemplary application of the invention, a vehicle GRID rating methodology is illustrated. The calculations herein represent a rating means, according to certain embodiments of the present disclosure. A GRID border experience is included in the calculations for a sequence of target GRID cells until one of the following criteria is met: (1) reach full or maximum credibility; (2) reach the maximum distance; or (3) reach maximum change in additional variable (e.g., percent change in population density). The GRID border experience may be adjusted based on a distance factor. The distance factor may be determined based on a linear or non-linear function of maximum truncated distance from the sequence of target GRID cells. The same distance factor may be applied to each cell within a given border.

Figure 8B:
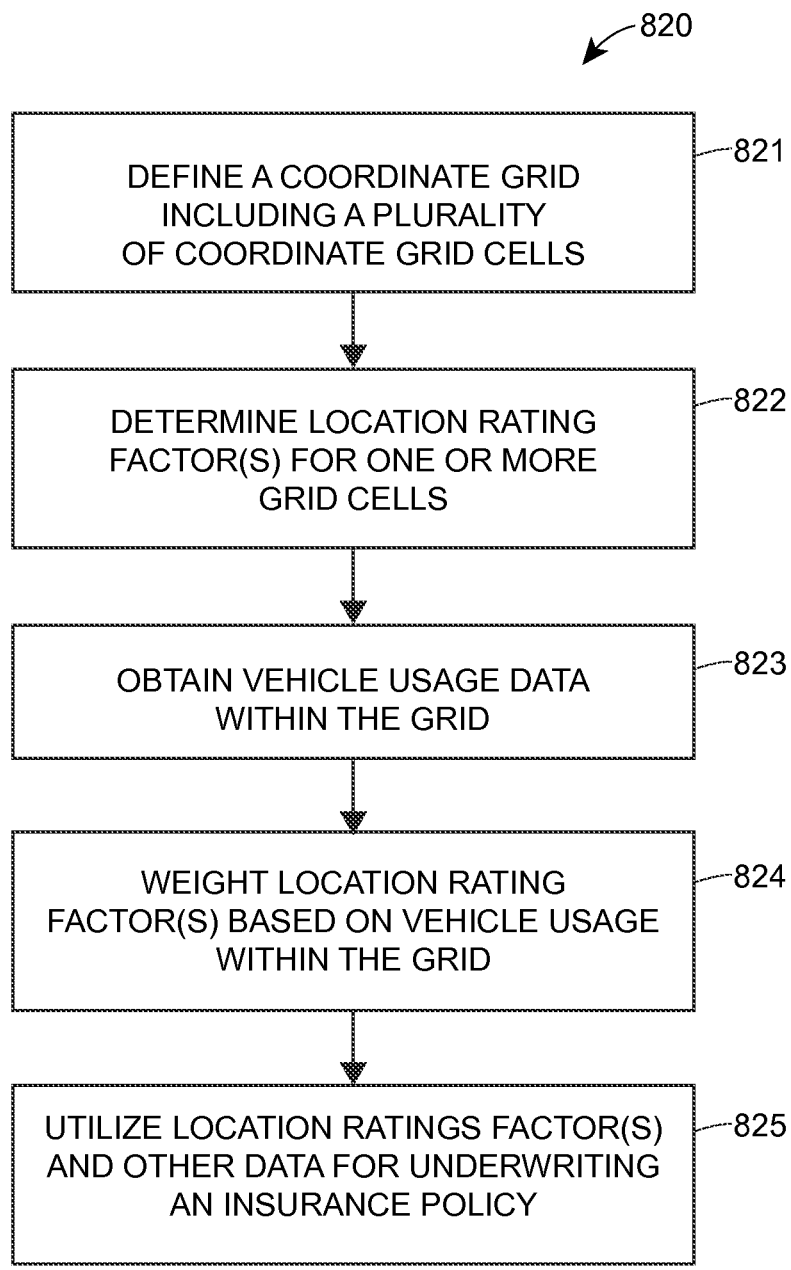
FIG. 8B provides a flow chart, which is illustrative of another embodiment of the invention.

According to a methodology for the research plan, a GRID cell experience border analysis may be conducted based on an insurance provider's historical data to predict non-catastrophe expected pure premiums by coverage. In FIG. 8B, an exemplary process for implementing an optimization program may evaluate the following coverage by: (1) maximum credibility assigned to a target cell's experience area; (2) distance weighting functions applied to border experience; (3) loss experience period used to develop a target cell's experience and the weight given to each year's experience; and (4) impact of changes in additional variables.

In FIG. 8B, the exemplary process for implementing a rating methodology for a vehicle policy is depicted in the flow diagram 820 wherein a coordinate grid including a plurality of grid cells is defined (block 821). A location rating factor for one or more of the defined grid cells is determined (block 822). The location rating factor may include vehicle usage information within the grid (block 823), which may be attained by a positioning module, e.g., GPS device, operatively coupled to the vehicle. The positioning module may also be incorporated within a smartphone associated with the vehicle.

The usage or operating information of the vehicle with respect to one or more grid cells may include: location(s), e.g., route(s) travelled by the vehicle, the average velocity of the vehicle, the maximum velocity of the vehicle, the amount of time the vehicle is within a particular grid cell, the distance travelled by the vehicle, the amount of time the vehicle was moving, the amount of time the vehicle was or idle (e.g., parked), the amount of time the engine of the vehicle is running, etc. One or more of the factors may be weighted based on the usage of the vehicle within the grid and/or within one or more particular grid cells (block 824). Other data that may be considered along with the usage information of the vehicle, include: age and driving experience of the vehicle operator or vehicle owner; weather and climate data of the geographic area associated with the grid; historical data; census data; quantity, frequency, and severity of insurance claims; driving statistics of the vehicle operator or vehicle owner and other drivers (insured and uninsured); road statistics; crime data; type and classification of the vehicle; time and date; population density, weather data; historical data, traffic conditions experienced by the vehicle, police reports, etc. One or more of the vehicle's usage information and other data may be applied to determine various coverages of liability, such as bodily injury, property damage, collision, other than collision, roadside assistance, medical, uninsured and underinsured motorists, etc. This information with respect to each grid cell within the sequence of grid cells may then be utilized, separately or in various combinations, to underwrite the vehicle insurance policy (block 825). In particular, one or more grid cells within the route's the sequence of grid cells may be used, not used, or weighted in the determination of the vehicle insurance policy.

The information with respect to one or more grid cells within the sequence of grid cells may also be used to compare against an existing vehicle insurance policy. For example, the usage information of the vehicle may be automatically compared to usage criteria of the insurance policy associated with the vehicle. If a discrepancy between the usage information of the vehicle and the usage criteria of the vehicle insurance policy is detected, a notification maybe be automatically generated and sent to a user, for example, an owner of the vehicle and/or an insurance agent associated with the vehicle. The notification may advise of the detected discrepancy of the vehicle's usage with respect to the insurance policy covering the vehicle.

According to another exemplary application of the invention, a vehicle GRID rating methodology is illustrated. The calculations herein represent a rating means, according to certain embodiments of the present disclosure. A GRID ring experience is included in the calculations for each target GRID cell within a sequence of target GRID cells until one of the following criteria is met: (1) reach full or maximum credibility; (2) reach the maximum distance; or (3) reach maximum change in additional variable (e.g., percent change in population density). The GRID ring experience may be adjusted based on a distance factor. The distance factor may be determined based on a linear or non-linear function of maximum truncated distance from the target GRID cell. The same distance factor may be applied to each cell within a given ring.

According to a methodology for the research plan, a GRID cell experience ring analysis may be conducted based on an insurance provider's historical data to predict non-catastrophe expected pure premiums by coverage. An optimization program may evaluate the following coverage by: (1) maximum credibility assigned to a target cell's experience area; (2) distance weighting functions applied to ring experience; (3) loss experience period used to develop a target cell's experience and the weight given to each year's experience; and (4) impact of changes in additional variables.

Figure 10:
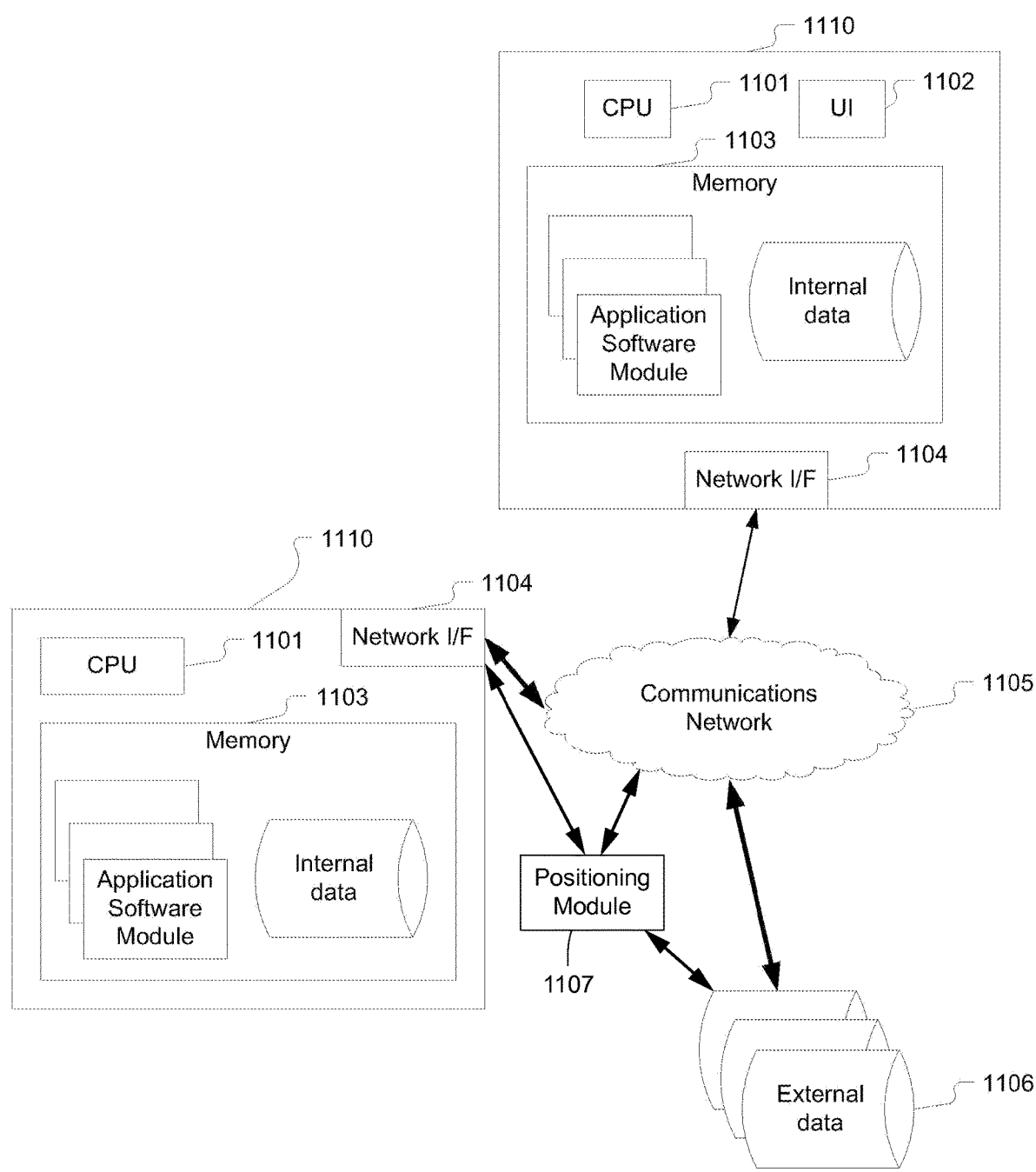
FIG. 10 illustrates a computing and information handling system according to one embodiment of the invention.

Data and methodology for this vehicle example are provided in FIGS. 9A-9F. FIG. 9A provides representative GRID distance weighting values, for a vehicle example. FIG. 9B provides an overview of the methodology for a vehicle example. FIG. 9C provides the GRID ring level data for a vehicle example. FIG. 9D provides the GRID cell level data for a vehicle example. FIG. 9E provides methodologies for calculating distance between two latitude and longitude coordinate pairs in a vehicle example. FIG. 9F provides the results of the distance calculations for a vehicle example. System FIG. 10 illustrates an exemplary computing and information handling system according to one embodiment of the invention. System 1100 comprises one or more computers 1110. Each computer 1110 may comprise a central processing unit (CPU) 1101, a user interface 1102, a memory 1103, and a network interface 1104. The memory 1103 comprises one or more application software modules and one or more internal data stores. System 1100 further comprises a communications network 1105 and external data stores 1106.

Computer 1110 may be any type of general purpose or specialized computer system. In some embodiments computer 1110 may be a personal computer (e.g., an X86-based computer) running an operating system such as UNIX™, OSX™, or WINDOWS™. In some embodiments computer 1110 may be a server or workgroup class system such as those offered by IBM™, HP™, COMPAQ™, or ORACLE™. In other embodiments, computer 1110 may be a mainframe system such as an IBM ZSERIES™ mainframe. System 1100 may comprise a heterogeneous or homogeneous network of computers 1110. In some embodiments, computer 1110 may be a mobile device such as a laptop or smart phone.

CPU 1101 may be any general purpose processor including ARM™, X86, RISC, and Z1O™. Memory 1103 may be any form or combination of volatile and/or non-volatile tangible computer readable medium including semiconductor memory (e.g., RAM, ROM, flash, EEPROM, and MRAM), magnetic memory (e.g., magnetic hard drives, floppies, and removable drive cartridges), optical memory (e.g., CD-ROM, DVD-ROM, BLURAY™ ROM, and holographic storage). Memory 1103 provides transient and/or persistent storage of Application Software Modules and Internal data. Memory 1103 also provides storage for operating system software including device drivers and system configurations. Network interface 1104 provides data interconnection—via communications network 1105—between computers 1110 and external data 1106.

Internal data may comprise data stored as bitmaps, vectors, objects, tables, and/or files. Internal data may be associated with GRID cells. Internal data may be comprehensive or may be a subset of data limited to a particular geographical region. In some embodiments, internal data may include a limited set of GRID cell data to allow an agent to perform rating operations using a mobile device (e.g., a mobile device running IOS™, ANDROID™ PALMOS™, or WINDOWS™). The data set may be limited to GRID cells in a given metropolitan area, for example. In some embodiments, internal data may be limited to one or more states where an agent is licensed to write policies. In some embodiments, internal data may include a limited set of GRID cell data to allow an agent to rate only certain predetermined perils (e.g., auto and homeowners, but not commercial fire).

Application Software modules comprise software or firmware instructions and configuration information that provides instructions to CPU 1101 to perform the steps of the methods, procedures, and functions disclosed herein. Application Software may be implemented in a compiled and/or interpreted environment. In some embodiments, Application Software modules may be implemented in a high-level programming language such as COBOL, FORTRAN, C, Cd-F, SmallTalk, JAVA™, C #, assembly language, JAVA™ server pages (JSP), application server pages (ASP), or VISUAL BASIC™.

Communications network 1105 may be a heterogeneous or homogenous set of physical mediums (e.g., optical fiber, radio links, and copper wires) and protocol stacks (e.g., ETHERNET™, FDDI, GSM, WIMAX™, LTE, USB™, BLUETOOTH™, FIOS™, 802.11, and TCP/IP.

External data 1106 may be any form of data source. In some embodiments, external data 1106 is received on an optical disk and imported into an internal data store for further processing. In some embodiments, external data 1106 is an external data store hosted on a computer accessible via communications network 1105. External data may include route information travelled by a vehicle and attained through a positioning module 1107, e.g., GPS device, operatively coupled to the vehicle. Alternatively, the route information of the vehicle attained by the positioning module 1107 may be provided to the computing device 1110. External data 1106 may be available for on demand retrieval or may be pushed by a data provider. External data 1106 may be transferred to computer 1110 in whole or in part. This transfer may be periodic, on demand, or as changes occur.

System 1100 may be configured such that one or more of the computers 1110 is configured with hardware and software that enables it to collect internal and/or external data and map that data into an internal data store associated with GRID cell identifiers. One or more computers 1110 are further configured to collect data for each target GRID cell and its adjacent GRID rings or sequence of target GRID cells and bordering cells, determine whether GRID rings and/or borders have enough historical data to provide actuarially credible results for each target GRID cell(s), adjust the data of the GRID rings and/or borders for distance, apply credibility weighting, and calculate pure premiums for each GRID cell.

The system 1100 is configured such that one or more of the computers 1110 is configured to receive an input request through a user interface 1102 for a rate quote for an insurance policy covering a risk associated with a particular location and/or route(s). The computer 1110 first obtains the latitude and longitude coordinates for the location via direct input (e.g., via user interface 1102), an address cross-reference table (e.g., a geolocation database), direct location coordinates from a positioning module 1107, e.g., GPS device, for one or more routes, etc. The computer 1110 then executes a look-up process whereby the latitude and longitude coordinates for the location and/or routes are used to identify a target GRID cell and/or sequence of target GRID cells in the GRID cell network. The computer 1110 then generates pure premiums for the target GRID cell and/or sequence of target GRID cells and returns a rate quote for the location and/or route(s).

The disclosure of U.S. patent application Ser. No. 13/226,785, filed Sep. 7, 2011, entitled "Systems and Methods for Grid-Based Insurance Rating," is hereby incorporated by reference.

For the purposes of this disclosure, the term exemplary means example only. Although the disclosed embodiments are described in detail in the present disclosure, it should be understood that various changes, substitutions and alterations can be made to the embodiments without departing from their spirit and scope.

What is claimed is:

1. A method executed on a programmed computer system to provide a location rating factor for facilitating the underwriting and/or the rating of an insurance product for a vehicle, the programmed computer system having one or more processors communicatively coupled to a user interface and a non-transitory computer-readable-medium having stored instructions executable by the one or more processors to perform the method comprising:
   receiving, via the user interface, a query for a vehicle insurance rate for the vehicle;
   receiving, at the one or more processors, sensor data attained from a global positioning system (GPS) device disposed with the vehicle, the sensor data including usage data of the vehicle within a geographic area defined by a plurality of grid cells;
   determining, via the one or more processors, a sequence of the grid cells based on the usage of the vehicle, wherein each of the of grid cells within the sequence encompasses at least a portion of the geographic area where the vehicle was used;
   querying, via the one or more processors, a database maintaining vehicle risk data associated with the geographic area to attain a set of vehicle risk data associated with each of the grid cells of the sequence of grid cells;
   receiving, at the one or more processors, the queried set of vehicle risk data associated with the sequence of grid cells; and
   calculating, via the one or more processors, a location rating factor based on the usage data of the vehicle and the received set of vehicle risk data associated with each of the grid cells of the sequence of grid cells.

2. The method of claim 1, further comprising:
   incorporating, via the one or more processors, the usage data of the vehicle associated with each of the grid cells of the sequence of grid cells into the vehicle risk data maintained in the database and.

3. The method of claim 1, further comprising:
   monitoring, via the global positioning system (GPS) device, usage of the vehicle within the geographic area; and
   storing the usage data of the vehicle at a memory device, the memory device coupled to the one or more processors.

4. The method of claim 1, wherein the usage data of the vehicle includes one or more of the following: location, route travelled, distance travelled, total time within at least one of the plurality of grid cells, time when vehicle ignition is on within at least one of the plurality of grid cells, time when vehicle ignition is off within at least one of the plurality of grid cells, maximum vehicle velocity within at least one of the plurality of grid cells, average vehicle velocity within at least one of the plurality of grid cells, maximum vehicle acceleration within at least one of the plurality of grid cells, average vehicle acceleration within at least one of the plurality of grid cells, and maximum vehicle deceleration within at least one of the plurality of grid cells.

5. The method of claim 1, wherein the vehicle risk data of the geographic area includes one or more of the following: census data within at least one of the plurality of grid cells, crime data within at least one of the plurality of grid cells, weather data within at least one of the plurality of grid cells, historical data within at least one of the plurality of grid cells, and other data within at least one of the plurality of grid cells, such as quantity of vehicle insurance claims, severity of vehicle insurance claims, frequency of vehicle insurance claims, driving statistics, road statistics, time, date, or population density.

6. The method of claim 1, further comprising:
   querying, via the one or more processors, the database maintaining vehicle risk data associated with the geographic area to attain a supplemental set of vehicle risk data associated with a supplemental set of grid cells that border the sequence of grid cells;
   receiving, at the one or more processors, the queried supplemental set of vehicle risk data associated with the supplemental set of grid cells; and
   calculating, via the one or more processors, a supplemental location rating factor based on the usage data and the received set of supplemental vehicle risk data associated with each of the grid cells of the supplemental set of grid cells that border the sequence of grid cells.

7. The method of claim 6, further comprising:
   adjusting, via the one or more processors, the location rating factor based on the calculated supplemental location rating factor.

8. The method of claim 6, wherein the set of supplemental vehicle risk data includes one or more of the following: census data within at least one of the plurality of grid cells, crime data within at least one of the plurality of grid cells, weather data within at least one of the plurality of grid cells, historical data within at least one of the plurality of grid cells, and other data within at least one of the plurality of grid cells, such as quantity of vehicle insurance claims, severity of vehicle insurance claims, frequency of vehicle insurance claims, driving statistics, road statistics, time, date, or population density.

9. The method of claim 1, further comprising:
comparing, via the one or more processors, the usage data of the vehicle to a usage criteria of a vehicle insurance policy;
detecting, via the one or more processors, a discrepancy between the usage data of the vehicle and the usage criteria of the vehicle insurance policy;
notifying, via the one or more processors, an entity associated with the vehicle of the detected discrepancy between the usage data of the vehicle and the usage criteria of the vehicle insurance policy.

10. The method of claim 9, wherein the comparing, detecting, and notifying occur when the vehicle is used within the geographic area.

11. A method executed on a programmed computer system to provide a location rating factor for facilitating the underwriting and/or rating of an insurance product for a vehicle, the programmed computer system having one or more processors communicatively coupled to a user interface and a non-transitory computer-readable-medium having stored instructions executable by the one or more processors to perform the method comprising:
defining, via the one or more processors, a geographic area into a plurality of grid cells, each of the plurality of grid cells including a coordinate pair, the coordinate pair including a longitude coordinate component and a latitude coordinate component;
receiving, via the one or more processors, a query for a vehicle insurance rate of the vehicle;
receiving, at the one or more processors, sensor data attained from a global positioning system (GPS) device disposed with the vehicle, the sensor data including usage data of the vehicle within the geographic;
determining, via the one or more processors, a sequence of the grid cells, wherein each of the grid cells within the sequence encompasses at least a portion of the geographic area where the vehicle was used;
querying, via the one or more processors, a database maintaining vehicle risk data associated with the geographic area to attain a set of vehicle risk data associated with each of the grid cells of the sequence of grid cells;
receiving, at the one or more processors, the queried set of vehicle risk data associated with the sequence of grid cells; and
calculating, via the one or more processors, a location rating factor based on the usage data of the vehicle and the received set of vehicle risk data associated with each of the grid cells of the sequence of grid cells.

12. The method of claim 11, further comprising:
grouping, via the one or more processors, the plurality of grid cells based on the vehicle risk data associated with each grid cell.

13. The method of claim 11, further comprising:
adjusting, via the one or more processors, at least one of the longitude and latitude components of the coordinate pair of at least one grid cell of the geographic area.

14. The method of claim 13, wherein the adjusting at least one of the longitude and latitude coordinate components of the coordinate pair includes truncating the coordinate component.

15. The method of claim 11 further comprising:
communicating, via the one or more processors, the calculated location rating factor to the user.

16. A system for facilitating the underwriting and/or rating of an insurance product for a vehicle, the system comprising:
one or more processors communicatively coupled to a user interface;
a global positioning system (GPS) device coupled to the one or more processors;
a coordinate grid system associated with a geographic area, the coordinate grid system including a plurality of grid cells;
a database communicatively coupled to the one or more processors, the database maintaining vehicle risk data associated with the geographic area;
a non-transitory computer-readable-medium communicatively coupled to the one or more processors; and
a set of computer-readable instructions stored in the non-transitory computer-readable-medium, which when executed by the one or more processors, is configured to:
receive, via the user interface, a query for a vehicle insurance rate of the vehicle;
receive sensor data attained from the global positioning system (GPS) device, the sensor data including usage data of the vehicle within the geographic area;
determine a sequence of grid cells based on the usage of the vehicle, wherein each of the of grid cells within the sequence encompasses at least a portion of the geographic area where the vehicle was used
query the database maintaining vehicle risk data associated with the geographic area to attain a set of vehicle risk data associated with each of the grid cells of the sequence of grid cells;
receive the queried set of vehicle risk data associated with the sequence of grid cells; and
calculate a location rating factor based on the usage data of the vehicle and the received set of vehicle risk data associated with each of the grid cells of the sequence of grid cells.

17. The system of claim 16, wherein the set of computer-readable instructions further include:
query the database maintaining the vehicle risk data associated with the geographic area to attain a supplemental set of vehicle risk data associated with each of the grid cells that border the sequence of grid cells;
receive the queried supplemental set of vehicle risk data associated with the supplemental set of grid cells;
calculate a supplemental location rating factor based on the usage data of the vehicle and the received set of supplemental vehicle risk data associated with each of the grid cells of the supplemental set of grid cells; and
adjust the location rating factor based on the calculated supplemental location rating factor.

18. The system of claim 16, wherein the usage data of the vehicle includes one or more of the following: location, route travelled, distance travelled, total time within at least one of the plurality of grid cells, time when vehicle ignition is on within at least one of the plurality of grid cells, time when vehicle ignition is off within at least one of the plurality of grid cells, maximum vehicle velocity within at least one of the plurality of grid cells, average vehicle velocity within at least one of the plurality of grid cells, maximum vehicle acceleration within at least one of the plurality of grid cells, average vehicle acceleration within at least one of the plurality of grid cells, and maximum vehicle deceleration within at least one of the plurality of grid cells.

19. The system of claim 16, wherein the vehicle risk data of the geographic area includes one or more of the following: census data within at least one of the plurality of grid cells, crime data within at least one of the plurality of grid cells, weather data within at least one of the plurality of grid cells, historical data within at least one of the plurality of grid cells, and other data within at least one of the plurality of grid cells, such as quantity of vehicle insurance claims, severity of vehicle insurance claims, frequency of vehicle insurance claims, driving statistics, road statistics, time, date, or population density.

20. The system of claim 16, wherein the set of computer-readable instructions further includes:
   incorporate the usage data of the vehicle associated with each of the grid cells of the sequence of grid cells into the vehicle risk data maintained in the database.

* * * * *